United States Patent
Capozzi et al.

(10) Patent No.: US 11,657,364 B1
(45) Date of Patent: May 23, 2023

(54) LOGISTICAL MANAGEMENT SYSTEM

(71) Applicant: Airspace Technologies, Inc., Carlsbad, CA (US)

(72) Inventors: Sergio Capozzi, Solana Beach, CA (US); Brandy Reed Giestas, Watertown, MA (US); Derek Cannon, Oceanside, CA (US); Gregory Lawrence, Solana Beach, CA (US); Ryan Rusnak, Vista, CA (US); Melinda Wu, Oceanside, CA (US); Chad Molenda, Carlsbad, CA (US); Jacob Kania, Solana Beach, CA (US)

(73) Assignee: Airspace Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/534,070

(22) Filed: Nov. 23, 2021

(51) Int. Cl.
| | |
|---|---|
| *G06Q 10/08* | (2012.01) |
| *G06N 20/00* | (2019.01) |
| *G06Q 10/0835* | (2023.01) |
| *G06Q 10/0832* | (2023.01) |
| *G06Q 10/0833* | (2023.01) |

(52) U.S. Cl.
CPC ....... *G06Q 10/08355* (2013.01); *G06N 20/00* (2019.01); *G06Q 10/0832* (2013.01); *G06Q 10/0833* (2013.01)

(58) Field of Classification Search
CPC ......... G06Q 10/08355; G06Q 10/0832; G06Q 10/0833; G06N 20/00
See application file for complete search history.

(56) References Cited

U.S. PATENT DOCUMENTS

| | | | | |
|---|---|---|---|---|
| 2005/0234641 | A1* | 10/2005 | Marks | G06Q 10/08 701/484 |
| 2007/0016363 | A1* | 1/2007 | Huang | G08G 1/202 701/533 |
| 2015/0120600 | A1* | 4/2015 | Luwang | G06Q 10/08355 705/338 |
| 2017/0046653 | A1* | 2/2017 | Wilson | G06Q 10/0838 |
| 2022/0129849 | A1* | 4/2022 | Mimassi | G06Q 50/28 |

OTHER PUBLICATIONS

Laetitia Dablanc, Goods transport in large European cities: Difficult to organize, difficult to modernize, 2007, p. 280-285 (Year: 2007).*

* cited by examiner

*Primary Examiner* — Resha Desai
*Assistant Examiner* — Ibrahim N El-Bathy
(74) *Attorney, Agent, or Firm* — Sterne, Kessler, Goldstein & Fox P.L.L.C.

(57) ABSTRACT

A system and methods to facilitate transporting goods is disclosed. In aspects, the system can have a user interface comprising a display, a non-transitory computer-readable medium comprising instructions, and a processor in communication with the non-transitory computer-readable medium and with the display. The instructions can be executed by the processor to process a user request for transporting the good from a pickup location to a destination location. Based on the user request, a preferred route from the pickup location to the destination location can be generated. The transporting can be controlled using a display by modifying a task icon.

13 Claims, 15 Drawing Sheets

| ALL ORDERS | GROUND | NFO | FREIGHT | HEALTHCARE | STAT | MCP | ROUTED | ESCALATED | WILL CALL |
|---|---|---|---|---|---|---|---|---|---|
| 239171 | EN ROUTE TO PICKUP →SEA · SEA | | | KIP OSHAUGHNESSY | THE POLYCLINIC →THE POLYCLINIC MADISON CENTER | | | NO FOLLOW UP TIME | +2 |
| 239169 | OPS ACKNOWLEDGED GMC · MO | | | | MIRACLES IN SIGHT (MIRACLES IN SIGHT · JOHN S. CONNO... | | | NO FOLLOW UP TIME | |
| 239168 | EN ROUTE TO DESTINATION →LLC · LLC | | | MOSES ILUNGA | LABCORP MA → 5LC (XXXX CLINIC · RT (ST. MARK'S HOSP... | | | NO FOLLOW UP TIME | +2 |
| 239158 | EN ROUTE TO DESTINATION →DEN · DEN | | | ALEX (NUTCHA) PRINDAVONG | LABCORP MA → DEN (XXXXXFIELD PROS 144TH · LABCORP) | | | NO F 37M AGO – CONFIRM RECOVERY/SWEEP IN 1H 22M – CONFIRM FINAL DELIVERY | +2 |
| 239154 | CUSTOMER COMPLETED →MD · ORD | | | | DB SCHENKER → AOG (XXXXXXXXXXX AEROSPACE · AIR FI... | | | NO FOLLOW UP TIME | +1 |
| 239140 | EN ROUTE TO PICKUP →STL · STL | | | 24/7 EXPRESS LOGISTICS | ROI → STAT (MERCY HOSPITAL · MERCY HOSPITA... | | | NO FOLLOW UP TIME | |
| 239126 | EN ROUTE TO PICKUP MEM · LIN | | | TERRANCE COVINGTON | MCKESSON PLASMA AND BIOLOGICS (XXXXXX MEMPHIS DC · XXXXXX... | | | 43 MINUTES AGO · PA... | |
| 239125 | OPS ACKNOWLEDGED LAX · DNK | | | | PANALPINA (LAX · XXXXXXX · INTEL OCGTILLO) | | | 33 MINUTES AGO · SC... | +2 |
| 239039 | ACCEPTED BY AIRPLANE DFW · PHI | | | 35830406 | CEVA · LOCKHEED (CEVA · XXX · LOCKHEED MARTIN) | | | 33 MINUTES AGO · CO... | +2 |
| 239067 | EN ROUTE TO DESTINATION →USA · USA | | | DRIVER 5 ATLEAS TRANSP... | CALIFORNIA CRYOBANK · NEW YORK (CALIFORNIA CRYOBANK · XXXXXXXX... | | | 33 MINUTES AGO · CO... | |
| 239081 | EN ROUTE TO PICKUP →MEX · MEX | | | BLAZE COURIER(LOGISTIC... | CONTACT TOWERS INTERNATIONAL (LOCKHEED MARTIN (LOCATED ON N... | | | 33 MINUTES AGO · CO... | |
| 239089 | ACCEPTED BY AIRLINE XXX · XXX | | | 35851174 | CEVA · LOCKHEED (XXXXXXX · LOCKHEED MARTIN (XX... | | | 33 MINUTES AGO · CO... | +2 |
| 237965 | ACCEPTED BY AIRLINE DFW · LAX | | | LESLEY WINGATE XXXXXXX | DB SCHENKER · AOG (SCHENKER, INC · DFW · (QUANTAS... | | | 33 MINUTES AGO · DV... | |
| 239062 | EN ROUTE TO PICKUP →USA · USA | | | DRIVER 5 ATLAS TRANSP... | CALIFORNIA CRYOBANK · NEW YORK (CALIFORNIA CRYOBANK · XXXXXXX... | | | 28 MINUTES AGO · CO... | |
| 238998 | REACHED DESTINATION... PHX · MCI | | | CROSSROADS COURIER · MCI XXXXXXX | DONOR NETWORK OF ARIZONA (DONOR NETWORK ARIZONA · UNI... | | | 23 MINUTES AGO · SC... | |
| 238554 | EN ROUTE TO DESTINATION →ATL · ATL | | | TOSIN OLUWO | CONTROL TOWERS INTERNATIONAL (TUCSON · ATL · XXXXXXX) | | | 18 MINUTES AGO · CO... | +2 |
| 238680 | ARRIVED AT DESTINATION →ALA · JFK | | | WORLD CONNECT | PANALPINA (XXXXXXX LLC · DELTA JFK) | | | 18 MINUTES AGO · NE... | |
| 238743 | ARRIVED AT DESTINATION | | | ELVIS ROALES | DB SCHENKER · AOG | | | 18 MINUTES AGO · CO... | |

LOGISTICAL MANAGEMENT SYSTEM

FIELD

The described aspects relate generally to logistical management systems and particularly logistical management systems for managing tasks associated with orders for shipment of a package of goods.

BACKGROUND

Some logistical management systems rely heavily on manual management of orders for transportations of goods. For example, these logistical management systems use operators to manually determine an appropriate route for the goods to get from their current location to a destination location, which sometimes includes stops until arriving at the destination location. Further, current logistical management systems use operators to manually manage tasks associated with the transportation of the goods. This reliance on operators to manually manage orders for transportation of goods can lead to errors, inconsistent management, and can burden the operators.

SUMMARY

Aspects of this disclosure are directed to a system and methods to facilitate transporting goods. In aspects, the system can have a user interface comprising a display, a non-transitory computer-readable medium comprising instructions, and a processor in communication with the non-transitory computer-readable medium and with the display. The instructions can be executed by the processor to process a user request for transporting the good from a pickup location to a destination location. Based on the user request, a pickup node representing the pickup location and a destination node representing the destination location can be identified within a pre-generated graph data structure. A first intermediate node representing a first intermediate location, and a second intermediate node representing a second intermediate location can be identified by traversing the pre-generated graph data structure based on the pickup node and the destination node.

The system can further determine a plurality of transportation edges that each relate to a transit cost associated with a corresponding one of the pickup location, the first intermediate location, the second intermediate location, and the destination location, where each of the plurality of transportation edges correspond to one of the pickup node, the first intermediate node, the second intermediate node, and the destination node such that each of the pickup node, the first intermediate node, the second intermediate node, and the destination node corresponds to the transit cost. A tendering edge corresponding to the first intermediate node can be determined. The tendering edge relates to an actual tender time to move the good from a first vehicle that has arrived at the first intermediate location to a tender location of the first intermediate location. A cargo edge corresponding to the first intermediate node can be determined. The cargo edge relates to a time for loading the good onto a second vehicle upon receipt of the good at the first intermediate location.

The system can generate a subgraph of the pre-generated graph data structure comprising the pickup node, the first intermediate node, the second intermediate node, the destination node, the tendering edge, the cargo edge, and the plurality of transportation edges and generate a preferred route from the pickup location to the destination location based on the subgraph. Further, the system can control the transportation of the good from the pickup location to the destination location along the preferred route. The controlling can include: modifying, by the processor, the display to include an automatically generated task icon associated with a task for managing the user request. The task icon can include: a description of the task; a counter that displays a count to or from a date that the task is scheduled to be completed; and a button that when activated performs an action related to the task.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings are incorporated herein and form a part of the specification.

FIG. 19 is an example user interface of a transport manager application illustrating a plurality of orders from different users.

FIG. 20 is an example user interface of a transport manager application illustrating a particular order.

DETAILED DESCRIPTION

Logistical management systems can for example provide end-to-end suites for managing the transport of goods from receipt of an order to transportation of goods to a destination location, such as the logistical management systems described in U.S. application Ser. No. 15/295,112 filed on Oct. 17, 2016 and published as U.S. Publ. No. 2018/0107967 on Apr. 19, 2018 and/or in U.S. Pat. No. 10,936,992 issued on Mar. 2, 2021, each of which are incorporated by reference in their entirety herein.

There can be a number of tasks or actions associated with management of transport of goods for the order including, for example, commissioning, tracking, or instructing transporters that transport the goods, approving optimal transportation routes for the goods, ensuring that client-specific instruction (e.g., special operational instructions (SOP)) are implemented for the order, ensuring that communication is made at the right time and to the right contacts during the course of an order, among others discussed later in reference to the logistical management system 1500. Many of these tasks are managed by a human operations team (e.g., "handlers") using a number of different features of user interfaces of the logistical management systems.

Figure 1:
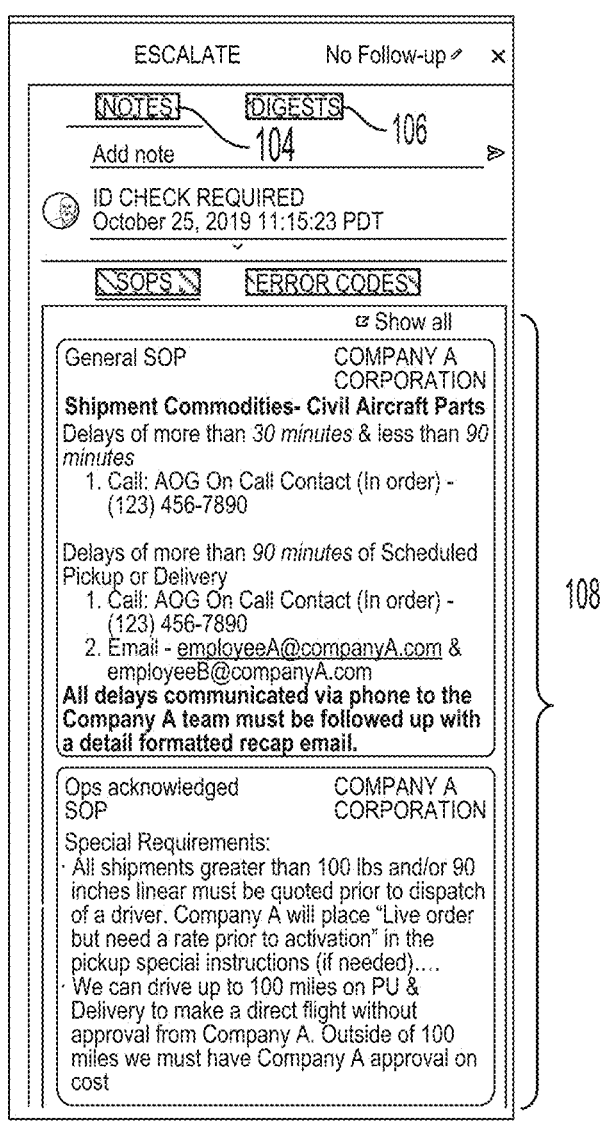
FIG. 1 is an example user interface.

For example, as illustrated in FIG. 1, logistical management systems can include a user interface 102 that handlers can use to create and/or manage notes 104, a digest 106, and/or SOP 108. Notes 104 can include text related to aspects of management of logistical management systems and can be manually input into logistical management systems by handlers. Handlers can manually set reminders to follow up on note 104 at an associated time and/or date. Digest 106 can be generated by the logistical management system in real-time to log records of a particular action associated with the logistical management system (e.g., leaving starting location, arriving at pickup location, departing pickup location, arriving at tender location, and completing tender, uploading tender documents, changing follow-up time, and changing delivery address, etc.). SOP 108 can be provided by handlers and/or users.

Managing tasks across different applications of the logistical management systems including for example notes 104, digest 106, and/or SOP 108 can be effective for tracking, monitoring, and/or logging the tasks for given orders. But creation and/or management of the tasks in this decentralized manner involves significant human interaction in the logistical management systems, for example, as handlers move between different applications to find and complete tasks for given orders. Such human interaction can introduce error into the system because, for example, handlers can forget to create tasks, incorrectly enter tasks, or can lose track of tasks that are spread across and/or buried within multiple applications of the logistical management systems. Further, reliance on human interaction can cause inconsistency in order management because different handlers can approach the creation and/or management of tasks in different manners. Additionally, certain notes 104 or SOP 108 may involve specialized knowledge or terms that may be easily understood by those reading the notes 104 or SOP 108 resulting in incorrectly executing tasks based on the notes 104 or SOP 108.

Aspects of the present disclosure are directed to logistical management systems that include task icons associated with various tasks for orders managed by the logistical management systems. Task icons refer to graphical icons, tabs, frames, panels, or panes of a user interface of a logistical management system that indicate a task to be performed to as a part of fulfilling an order and/or transporting/shipping a good. The task icons can be provided on a task dashboard of a user interface of the logistical management system. Providing task icons on a task dashboard can centralize the creation and/or management of tasks associated with orders managed by the logistical management systems and allow handlers and/or the logistical management system to view and/or manage a number of different tasks associated with an order in parallel. Further, the task icons can interface with existing applications of logistical management systems to further centralize and standardize management of existing tasks. By centralizing and standardizing the formation of task icons for given orders, logistical management systems can automate various tasks currently performed by handlers to improve the order management consistency and reduce system error. Further, by standardizing task creation and/or formation, the logistical management systems can assign tasks to appropriate entities (e.g., experienced handlers, inexperienced handlers, specialized handlers, and/or the logistical management system itself) including allowing different entities to manage different tasks of the same order.

For example, logistical management systems of this disclosure can automatically create task icons on behalf of handlers for various tasks. Task icons can automatically be created in response to various triggers. For example, the logistical management systems can automatically track transporters transporting goods for an order using, for example, global positioning systems employed by the transporters or associated with the goods. The logistical management systems can automatically create a task of checking in with the transporter if the tracked good is not at an anticipated location at an anticipated time. The logistical management systems can also automatically complete tasks in response to certain triggers. For example, if the logistical management system detects (e.g., from a GPS signal associated with the good) that a good is at an anticipated location at an anticipated time, the logistical management system can automatically record (e.g. in a digest) that the good has arrived at the location and in response will not create a task icon for the handler. Thus, the logistical management systems can offload tasks (e.g. of verifying that the good has arrived) from a handler.

The logistical management systems can automatically set aspects (e.g., due dates for completion of tasks) of the task icons managed by the system. For example, due dates can be automatically set by the logistical management systems in response to triggers. In aspects, in response to the trigger of an order status "ops acknowledged," the logistical management system can automatically create a task icon to confirm pickup of the package an amount of time before or after the pickup time or deliver time for the order, or an amount of time after the task icon was created. In aspects, logistical management systems can automatically create task icons using client SOP's.

Such logistical management systems can improve consistency by standardizing what tasks are created for certain orders, reduce human error by offloading the creation of tasks from handlers, can automatically assign tasks to handlers based on their expertise, and can improve accountability handlers by providing improved records of tasks associated with an order.

These and other aspects are discussed below with reference to FIGS. 2-21. Those skilled in the art will readily appreciate that the detailed description given herein with respect to these figures is for explanatory purposes only and should not be construed as limiting. Unless expressly indicated to the contrary or clear from context, the features of, and relationships between, like structures (e.g., task icons) can apply to any other like structures (e.g., task icons).

Figure 2:
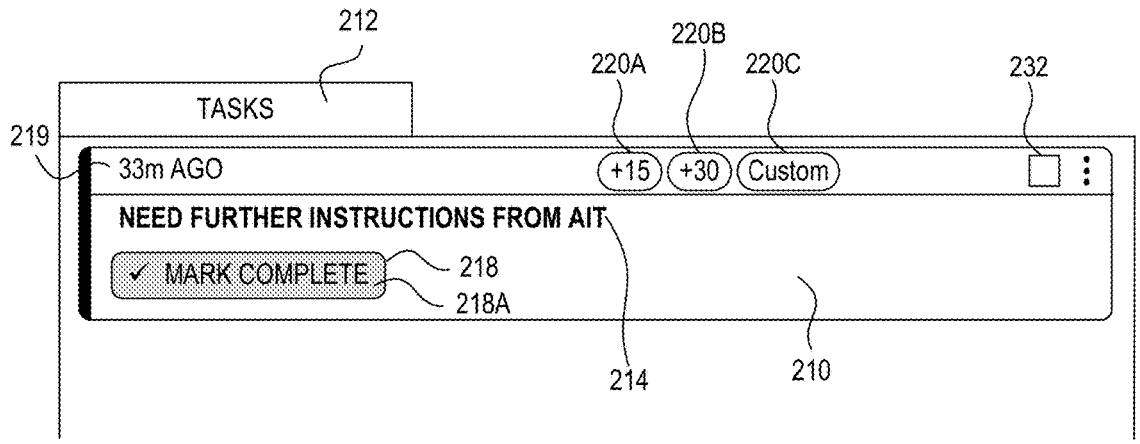
FIGS. 2-6 are example task icons on an example task dashboard.

FIGS. 2-6 show example task icons 210 displayed on a task dashboard 212. As discussed later, user interface 2000 of logistical management system (LMS) 1500 can be modified to include task icons 210 and task dashboard 212. As shown in FIG. 2, task icon 210 can include a description 214 of the task to be performed. Task icons 210 can additionally or alternatively include a button 218 that can display a completion status of the task. Button 218 can be displayed in different configurations to indicate, for example, a completion status of a task. For example, button 218 can be displayed in a first configuration 218A (e.g., with a light colored text and/or a dark colored background) when a task has not been completed and can be displayed in a second configuration 218B (e.g., with a dark colored text and/or a light colored background) when a task has been completed. In aspects, the first configuration 218A and the second configuration 218B can correspond to temporal status of a task. For example, if a task is due on a certain date, the colors of a button 218 can change from the second configuration 218B to the first configuration 218A if the task is not completed within a threshold number of days that the task is due. Additionally, the configurations can be changed to de-emphasize the button 218 if a task is complete, by for example, changing from the first configuration 218A to the second configuration 218B. The aforementioned are examples of how the configuration can be changed.

By displaying button 218 in multiple configurations a handler can quickly determine whether a task has been completed or still needs to be completed. Additionally or alternatively, activating button 218 can clear task icon 210 from task dashboard 212 once a task has been completed. In aspects, activating button 218 to complete the task can cause LMS 1500 to add a note 2020 to user interface 2000 to log that the task was completed, as well as other related information such as identifying the handler who completed the task and/or the date that the task was completed.

Task icons 210 can include a counter 219 that displays a count to or from a date (i.e., day and/or time) that the task is scheduled to be completed. LMS 1500 can automatically set the date the task is to be completed. For example, for an order, LMS 1500 can automatically set the date the task is to be completed relative to, for example, a pickup time for a transporter to pick up a good, a time flight is scheduled to leave, when the good is expected to be tendered at an airport, an expected arrival time at the final destination, etc.

Task icons 210 can include one or more quick action buttons 220A-220C that can adjust the date the task is scheduled to be completed. In aspects, quick action buttons 220A-220C can include an indicator representing an amount of time that the date the task is scheduled to be completed can be adjusted. When activated, quick action buttons 220A-220C can adjust the date the task is scheduled to be completed by the fixed amount of time. In aspects, the fixed amount of time can be automatically set by LMS 1500. Additionally or alternatively, the fixed amount of time can be customizable by the handler. Task icons 210 can include multiple quick action buttons 220A-220C that can adjust the date by different fixed amounts of time. For example, task icons 210 can include a first quick action button 220A that can adjust the date by a first fixed amount, e.g., 15 minutes. Task icons 210 can include a second quick action button 220B that can adjust the date by a second fixed amount, e.g., 30 minutes. In aspects, the first and second fixed amounts can be different from each other such that a handler can quickly adjust the date by different fixed increments. Additionally or alternatively, task icons 210 can include a third quick action button 220C that can adjust the date by a third fixed amount. The third fixed amount can for example be configurable and customizable by the handler such that the handler can quickly adjust the date by any desired amount of time to extend the due date the task is scheduled to be completed. In aspects, task icons 210 can include any number of quick action buttons 220A-220C.

A characteristic of counter 219 can change as the count changes relative to the date the task is scheduled to be completed. For example, counter 219 can change colors. In some aspects, the colors can be red, yellow, or green. The designated color can be selected based on predetermined rules. For example, counter 219 can be green until reaching a predefined threshold (e.g., relative to the date the task is scheduled to be completed) and thereafter change to yellow. Thereafter, after reaching another predefined threshold (e.g., relative to the date the task is scheduled to be completed), the designated color can change to red. This can allow assigned handlers or other authorized users to prioritize management of the tasks.

Figure 3:
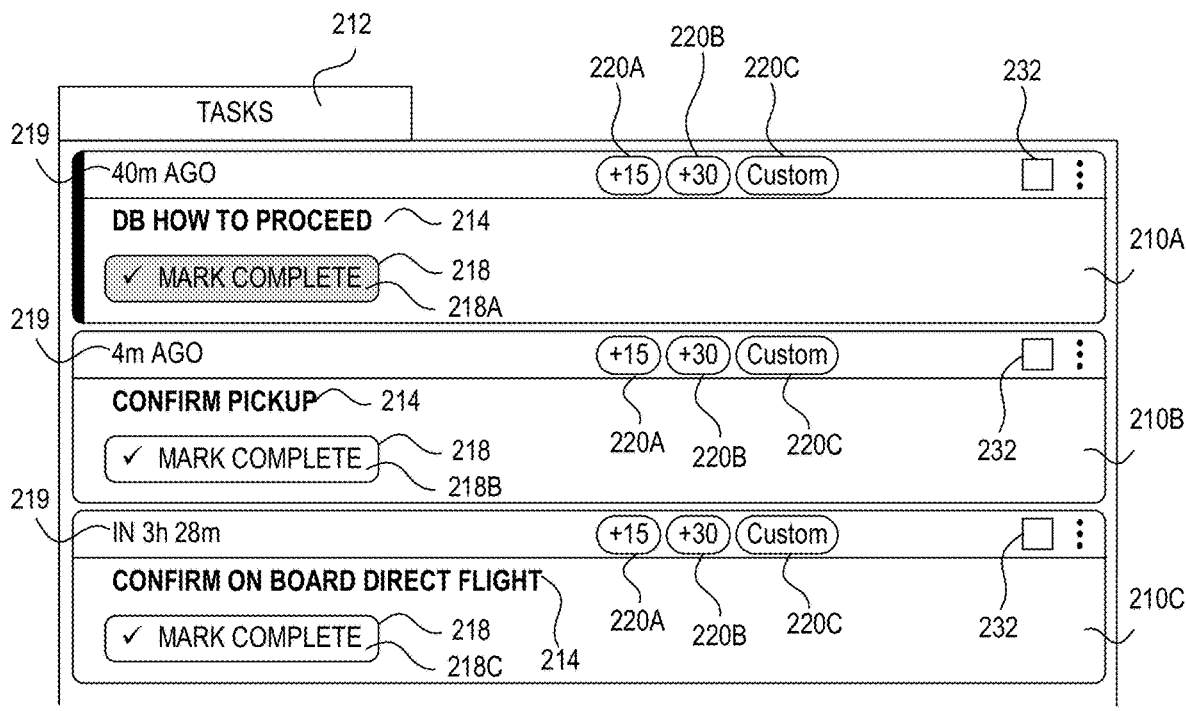
Figure 6:
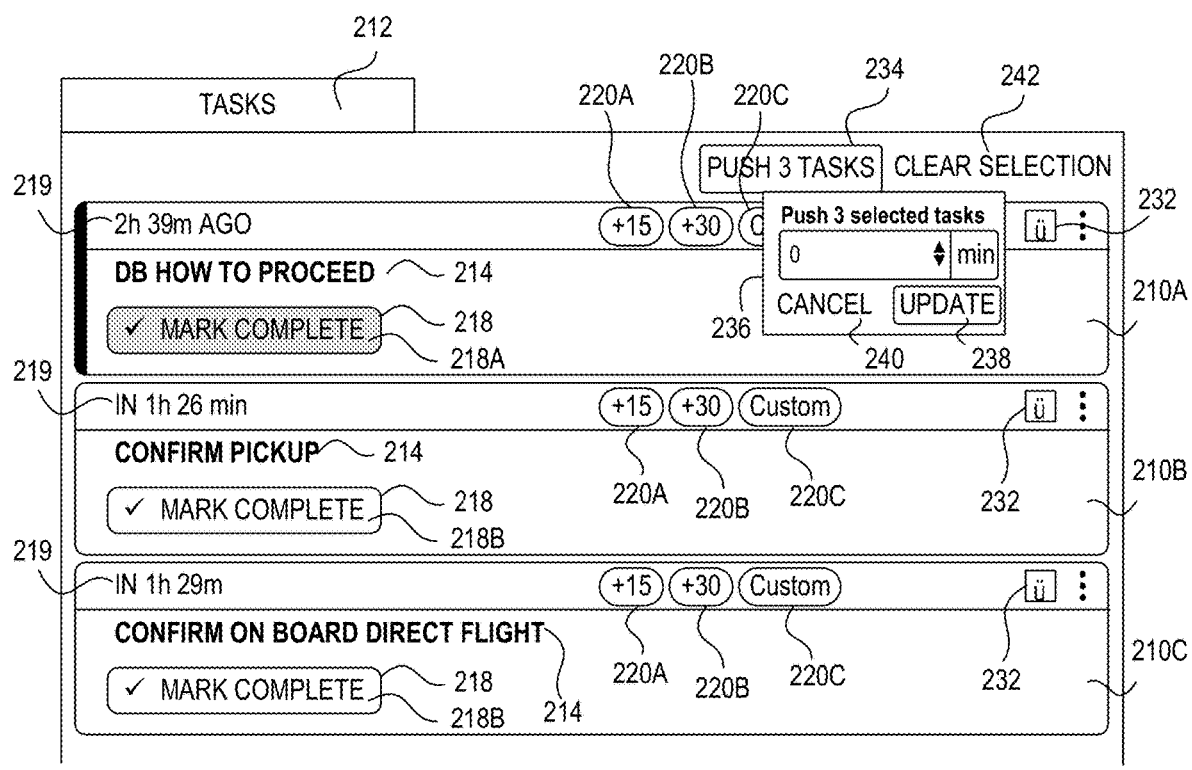

As shown in FIGS. 3 and 6, multiple task icons 210A-210C can be provided on task dashboard 212 to manage and/or monitor multiple tasks in parallel. Accordingly, handlers can manage and/or monitor multiple tasks for a given order on one interface, which can help ensure tasks are properly prioritized and/or not missed.

In aspects, task icons 210 can be automatically created, by for example LMS 1500, in response to certain triggers. As discussed later, LMS 1500 can include a communication interface that can receive data from an external device (e.g., a computer of a user, transporter, shipper, etc.) and in response can automatically generate a task icon. For example, when an order is received from a user, LMS 1500 can automatically create one or more task icons 210 associated with tasks that can be completed to satisfy the order. LMS 1500 can automatically set and/or update due dates for the tasks. LMS 1500 can automatically set and/or update due dates for the tasks based on expected events associated with the order including for example, a pickup time of a package of goods by a transporter, an expected departure time for a flight, an expected arrival time, etc. LMS 1500 can automatically assign tasks to handlers, transporters, or can complete tasks itself.

Figure 4:
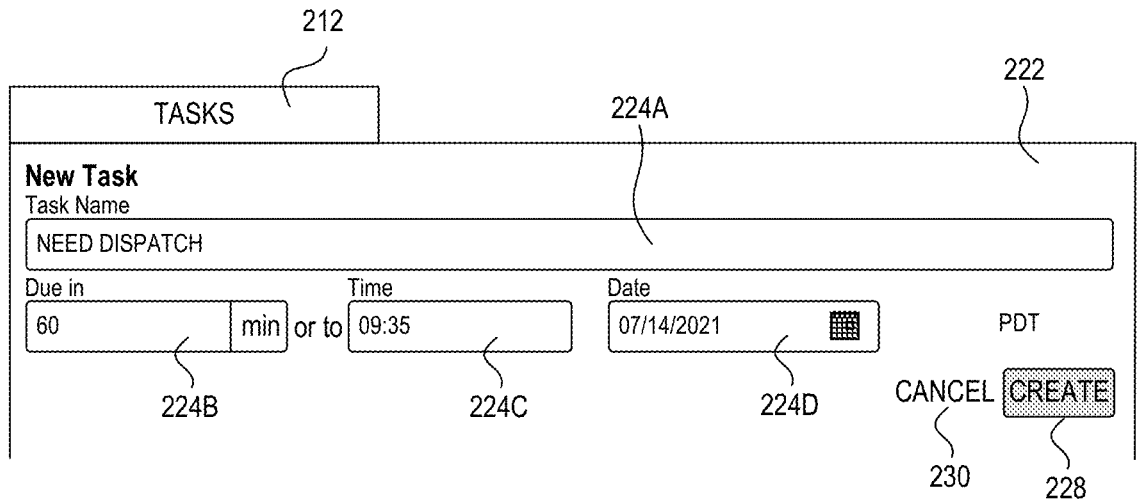
Figure 5:
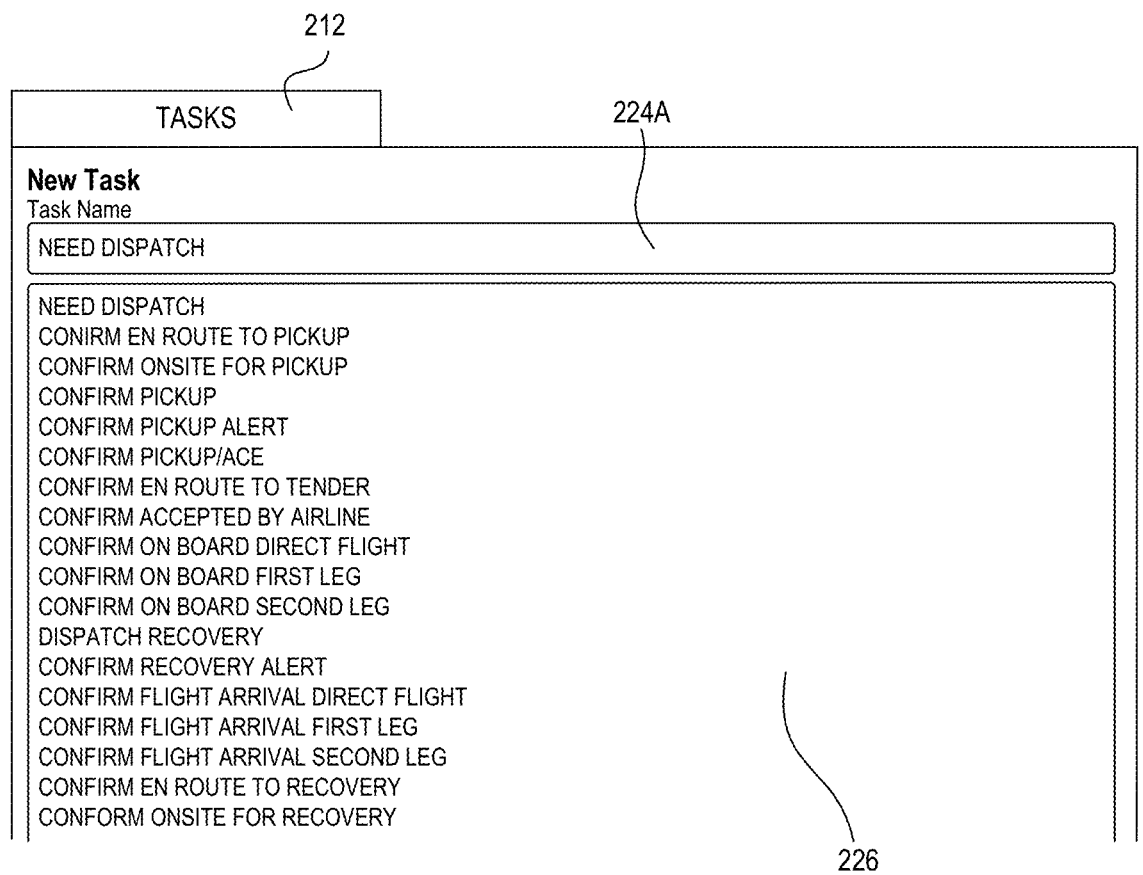

In aspects such as those shown in FIGS. 4 and 5, handlers can manually create task icons 210. For example, as discussed later in reference to FIG. 20, a user interface 2000 of LMS 1500 can include a button 2026 for creating a new task and associated task icon 210. After pushing button 2026, a task creation icon 222 can be created on task dashboard 212. Task creation icon 222 can include fields 224A-224D for users to input information associated with the task. For example, task creation icon 222 can include a first field 224A for inputting the name of the task. The name of the task can be manually entered into first field 224A by handler. Additionally or alternatively, first field 224A can include a drop-down menu 226 pre-populated with tasks. The pre-populated tasks can be tasks that have happened in the past (e.g., associated with past orders), tasks known to be common for the handlers, or recommended tasks that may be appropriate given the current state of the order. Tasks displayed on drop-down menu 226 can be sorted. For example, tasks displayed on drop-down menu 226 can be sorted based on the chronological order in which the tasks should occur for a particular order. In this manner, handlers can be guided through common tasks associated with given orders and can reduce or prevent human error by automatically identifying and suggesting tasks for given orders. Handlers can select tasks from drop-down menu 226 to associate them with a given order. Drop-down menu 226 can be searchable. For example, handlers can type descriptions of tasks into first field 224A and tasks can be automatically displayed in response.

Task creation icon 222 can include one or more fields 224B-224D associated with the due date that the tasks are to be completed by. For example, task creation icon 222 can include a second field 224B that can receive an input for an increment of time (e.g., 60 minutes) that the due date can be set from. Additionally or alternatively, task creation icon 222 can include a third field 224C that can receive an input for a time for the due date. Additionally or alternatively, task creation icon 222 can include a fourth field 224D that can receive an input for a day of the due date. Task creation icon 222 can include a first button 228 for creating the new task and associated task icon 210. When first button 228 is activated, task creation icon 222 can close and an associated task icon 210 can be created. Task creation icon 222 can include a second button 230 for canceling and exiting out of task creation icon 222.

In aspects, multiple task icons 210A-210C can be modified together in batches. For example, task icons 210A-210C can include a box 232 that can be selected together with boxes 232 of other task icons 210A-210C. Task icons 210A-210C with selected boxes 232 can be modified together. For example, as shown in FIG. 6 the due dates for multiple task icons 210A-210C can be pushed or moved together by the same increment of time. For example, task dashboard 212 can include a button 234 that can provide a field 236 for entering the increment of time to push the due dates of the selected task icons 210A-210C to. Field 236 can include a button 238 that can update the due dates of the selected task icons 210A-210C by the amount of time entered into field 236. Field 236 can include a button 240 that can cancel the batch update and close out field 236. Task dashboard 212 can include a button 242 that can clear the selected boxes 232 to cancel the batch modifications of the task icons 210A-210C.

Figure 7:
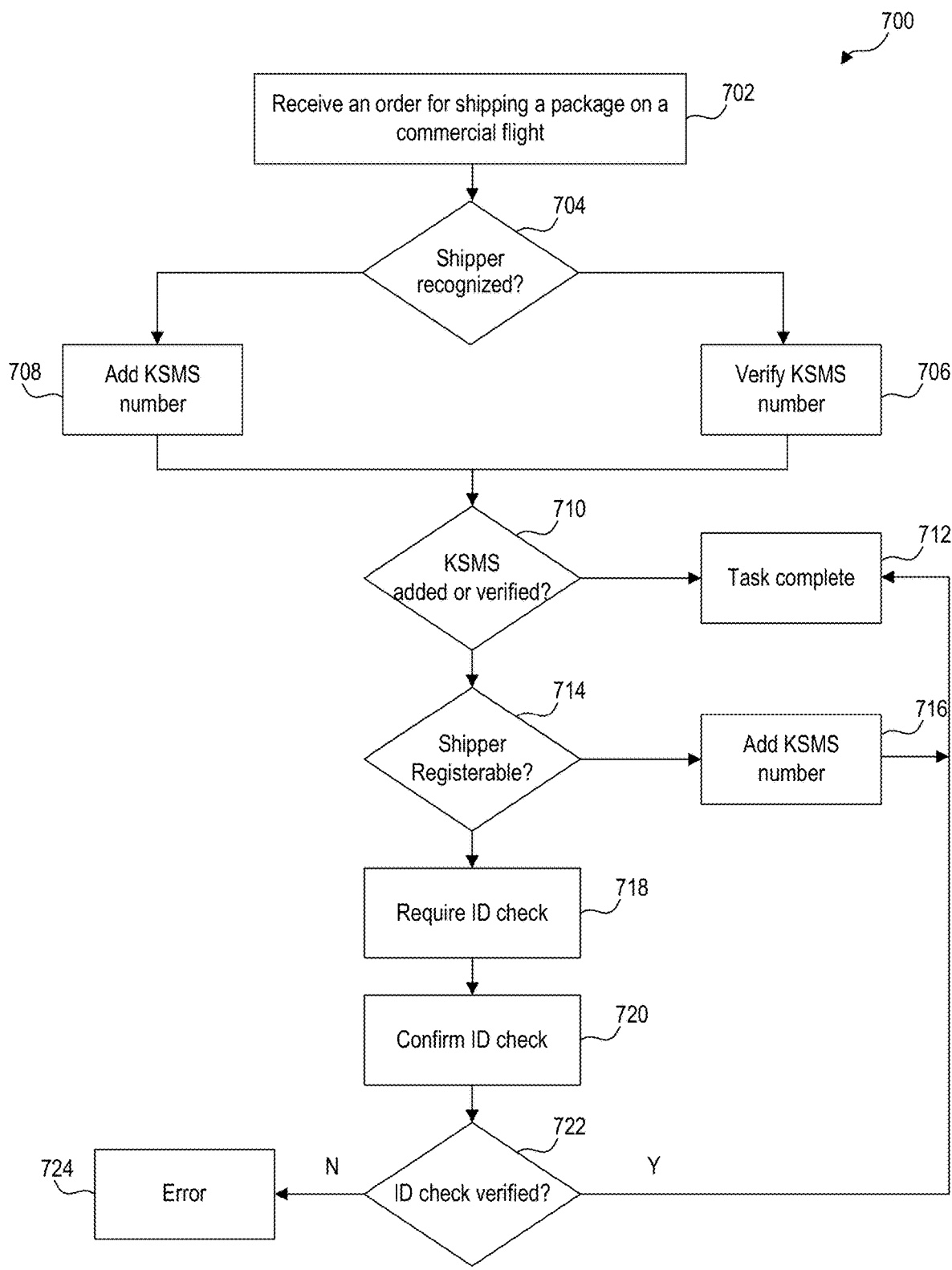
FIG. 7 is an example multistep task process.

FIG. 7 shows an example multistep task process 700 for managing orders shipped using commercial flights and to qualify users to ship goods on the commercial flights. Multistep task process 700 can be implemented by LMS 1500. FIGS. 8-14 show task icons 310A-G that can be interrelated for performance of multistep tasks, such as described in multistep task process 700. Task icons 310A-G can include any of the features of task icons 210 discussed previously and can include additional features as follows. For example, task icons 310A-G can include a description 314, a counter 319, quick action buttons 320A-320C, etc. In aspects, task icons 210 can also include the additional features discussed in reference to any of task icons 310A-G. Further, any of task icons 310A-G can be interrelated for performance of other multistep tasks in addition to or as an alternative to multistep task process 700.

Multistep task process 700 can include, at step 702, receiving for example at a processor of LMS 1500, an order for a user that includes a request for shipping a package of goods on a commercial flight.

Multistep task process 700 can include, at step 704, in response to receiving the order, LMS 1500 can automatically attempt to recognize a number associated with the user in a database. The number can, for example, be a known shipper management system (KSMS) number that indicates that the user is qualified to ship goods on commercial flights. Hereinafter, the terms "number" and "KSMS number" can be used interchangeably, but the disclosure is not limited to a KSMS number and can include other numbers associated with a user.

Figure 8:
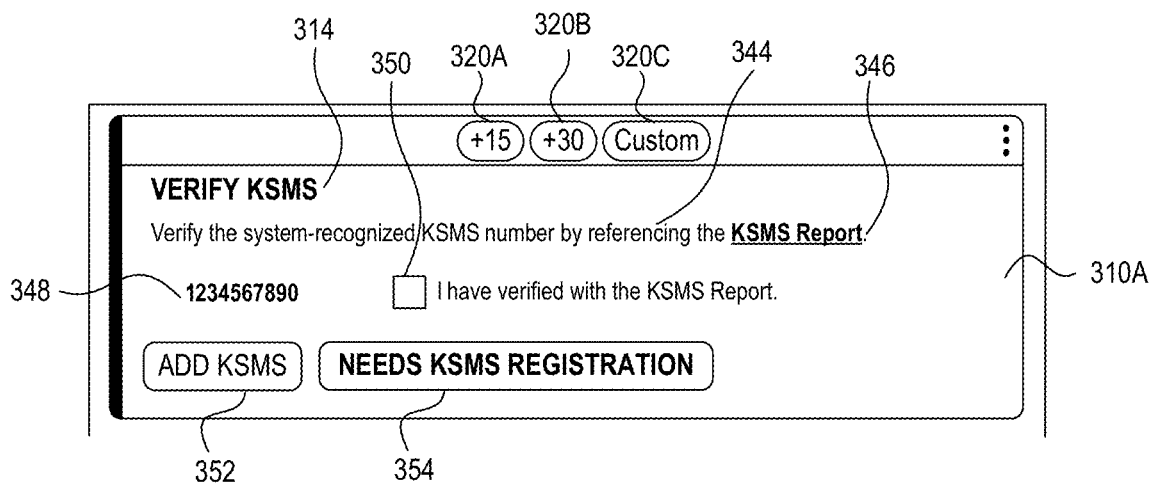
FIGS. 8-14 are example task icons that can be associated with steps of the example multistep task process.

If LMS 1500 is able to automatically recognize the number at step 704, multistep task process 700 can proceed to step 706 at which LMS 1500 can automatically create a task icon 310A for verifying the number, as shown in FIG. 8. Task icon 310A for verifying the number can include description 314 describing the task for example as "verify KSMS." Task icon 310A for verifying the number can include a sub-description 344 providing additional details about the task for verifying the number, such as instructions for a handler to verify the system recognized KSMS number by referencing a link 346 to a KSMS report that provides access to a database containing KSMS numbers managed by LMS 1500. Task icon 310A for verifying the number can include a field 348 that displays the system recognized KSMS number. Task icon 310A for verifying the number can include a box 350 for the handler to check to indicate that the handler verified the system recognized KSMS number by, for example, cross-referencing the system recognized KSMS number with the KSMS number listed in the KSMS report. Task icon 310A for verifying the number can include a first button 352 for adding the KSMS number to the order once verified by the handler to associate the number with the order. Task icon 310A for verifying the number can include a second button 354 for initiating a subtask of registering the user if the system recognized KSMS number could not be verified by handler.

Figure 9:
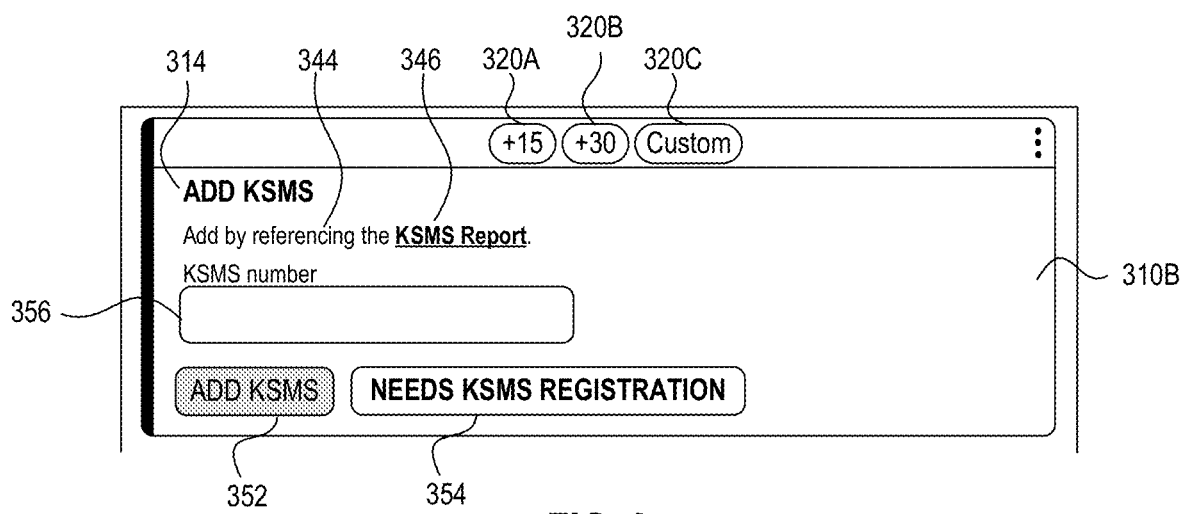

If LMS 1500 is not able to automatically recognize the number at step 704, multistep task process 700 can proceed to step 708 at which LMS 1500 can automatically create a task icon 310B for adding the number, as shown in FIG. 9. Task icon 310B for adding the number can include description 314 describing the task, for example, "ADD KSMS." Task icon 310B for adding the number can include sub-description 346 providing additional details about the task such as for example instructing a handler to add a KSMS number by referencing a link to the KSMS report. Task icon 310B for adding the number can include a field 356 for entering the KSMS number retrieved from the KSMS report. Task icon 310B for adding the number can include first button 352 for adding the KSMS number entered in field 356 to the order to associate the KSMS number with the order. Task icon 310B for adding the number can include second button 354 for initiating the subtask of registering the user if handler is not able to locate a KSMS number for the shipper in the KSMS report.

Multistep task process 700 can include, at step 710, LMS 1500 evaluating whether the KSMS number for the order has been added or verified. If LMS 1500 determines the KSMS number has been added or verified, multistep task process 700 can proceed to step 712 and can automatically complete the multistep task and qualify the user that placed the order to ship goods on the commercial flights. For example, if a handler selects first button 352 from task icon 310A or from task icon 310B, LMS 1500 can determine KSMS number has been added or verified and proceed to step 712.

Figure 10:
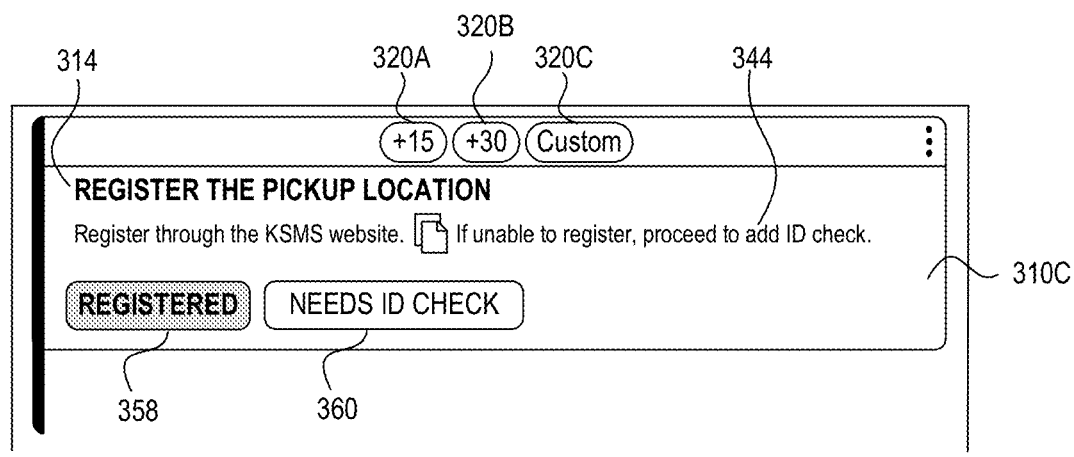

If LMS 1500 determines KSMS number has not been added or verified, multistep task process 700 can proceed to step 714 and LMS 1500 can determine whether the user can be registered. For example, LMS 1500 can automatically create a task icon 310C for registering the user, as shown in FIG. 10. Task icon 310C for registering the user can include description 314 describing the task, for example, as "Register the pickup location." Task icon 310C for registering the user can include sub-description 344 providing additional details about the task such as supplying a link to a website for registering the user. The link can be a hyperlink and/or can be a uniform resource locator (URL) that can be copied into a browser by a handler to direct the handler to the website for registering the user. In aspects, LMS 1500 can automatically attempt to register the user at the website using information from the order. Details about the task provided in sub-description 344 for task icon 310C can also include instructions if the user cannot be registered at the website such as "If unable to register, proceed to add ID check." Task icon 310C for registering the user can include a first button 358, which can be activated if the user has been registered with the KSMS website. Task icon 310C for registering the user can include a second button 360, which can be activated if the user could not be registered. Second button 360 can trigger an identification check, as discussed later.

Figure 11:
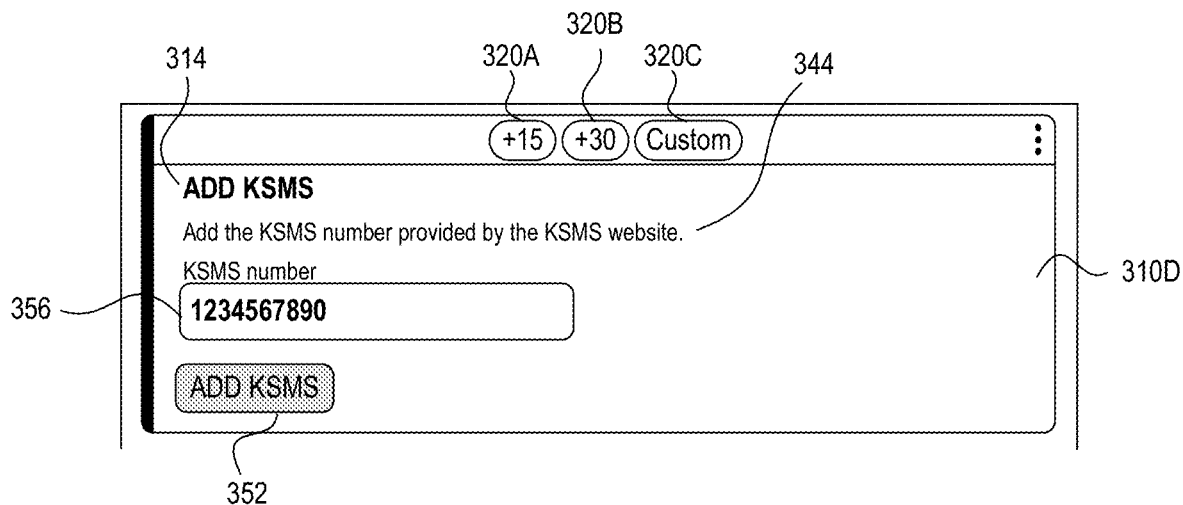

If LMS 1500 determines that the user can be registered, multistep task process 700 can proceed to step 716 and the KSMS number can be added to the order. For example, LMS 1500 can automatically create a task icon 310D for adding the number, as shown in FIG. 11. Task icon 310D for adding the number can include description 314 describing the task, for example, as "Add KSMS number." Task icon 310D for adding the number can include sub-description 344 providing additional details about the task, such as instructing a handler to add a KSMS number provided by the KSMS website. Task icon 310D for adding the number can include field 356 for entering the KSMS number provided from the KSMS website. Task icon 310D for adding the number can also include button 352 for adding the KSMS number entered in field 356 to the order. Once the handler activates button 352 and adds the KSMS number to the order, multistep task process 700 can proceed to step 712 and can automatically complete the multistep task.

Figure 12:
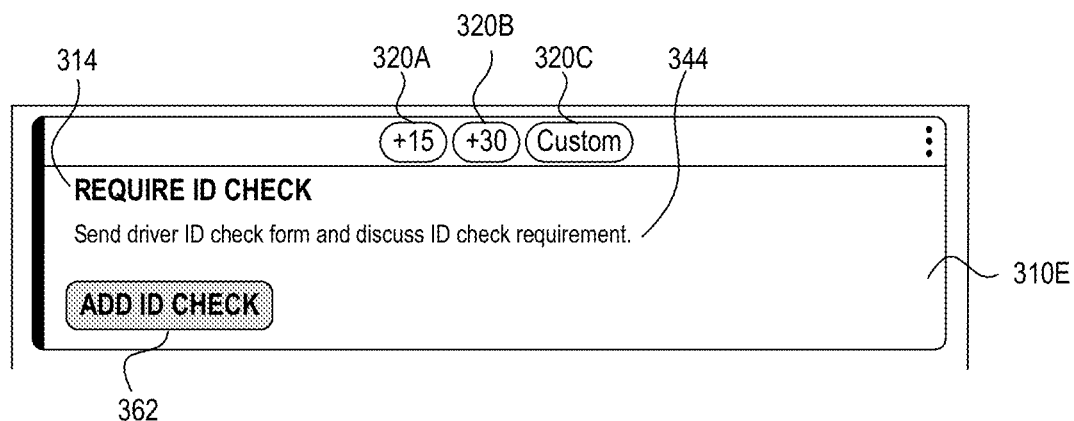

If user cannot be registered, multistep task process 700 can proceed to step 718 and an identification check can be initiated. For example, if user cannot be registered at the KSMS website, an identification check can be initiated by LMS 1500 and/or by the handler by activating second button 360. Initiation of the identification check can include LMS 1500 automatically creating a task icon 310E for requiring an identification check, as shown in FIG. 12. Task icon 310E for requiring an identification check can include description 314 of the task such as for example "Require ID check." Task icon 310E for requiring an identification check can include sub-description 344 providing additional details of the task. For example, sub-description 344 can include instructions for the handler to send a transporter instructions for the identification check and to discuss requirements for the identification check with the transporter. Alternatively, in aspects LMS 1500 can automatically send identification check instructions and requirements to the transporter in response to the determination that the user cannot be registered at step 714. Task icon 310E for requiring an identification check can include a button 362 for adding a subtask of adding the identification check.

Figure 13:
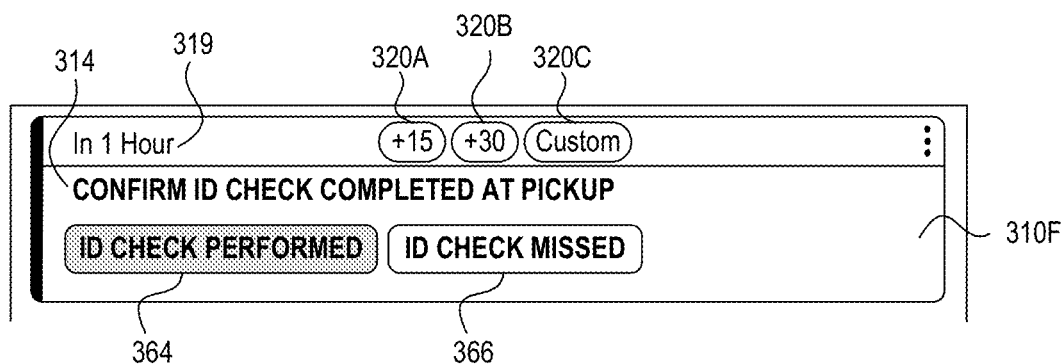

Multistep task process 700 can include, at step 720, LMS 1500 confirming whether an identification check has been completed at pickup of the package of goods. In aspects, this can include LMS 1500 automatically creating a task icon 310F for confirming completion of the identification check, as shown in FIG. 13. Task icon 310F for confirming completion of the identification check can include description 344, which can for example be "Confirm ID check completed at pickup." Task icon 310F for confirming completion of the identification check can include a first button 364 that a handler can activate if they have confirmed that the identification check has been performed. Task icon 310F for confirming completion of the identification check can include a second button 366 that a handler can activate if they are unable to confirm that the identification check was performed and/or if the identification check was missed.

Figure 14:
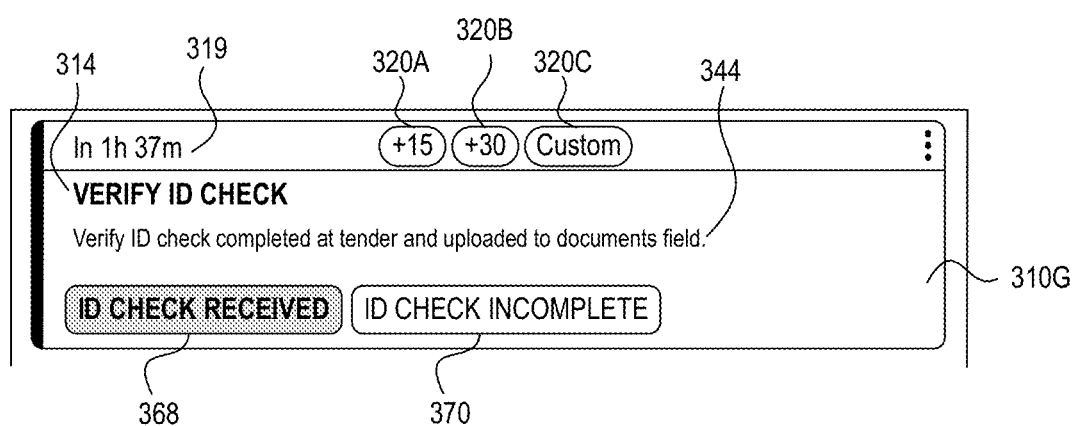

Multistep task process 700 can include, at step 722, LMS 1500 verifying whether the identification check has been completed. In aspects, this can include LMS 1500 automatically creating a task icon 310G for verifying that the identification check has been completed, as shown in FIG. 14. Task icon 310G for verifying that the identification check has been completed can include description 314 of the task such as for example "verify ID check." Task icon 310G for verifying that the identification check has been completed can include sub-description 344 providing additional details of the task. For example, sub-description 344 can include instructions for a handler to verify that the identification check has been completed and that supporting documentation has been uploaded to LMS 1500. Task icon 310G for verifying that the identification check has been completed can include a first button 368 that a handler can activate if the identification check documents have been uploaded into LMS 1500. Task icon 310G for verifying that the identification check has been completed can include a second button 370 that a handler can click if the identification check is incomplete.

If the identification check is verified at step 722 (for example if first button 368 of task icon 310G is activated), multistep task process 700 can proceed to step 712 and can automatically complete the multistep task. If the identification check is not verified at step 722, for example if second button 370 of task icon 310G is activated, multistep task process 700 can proceed to step 724 at which an error in qualifying the user to ship the package on a commercial flight can be indicated.

Figure 15:
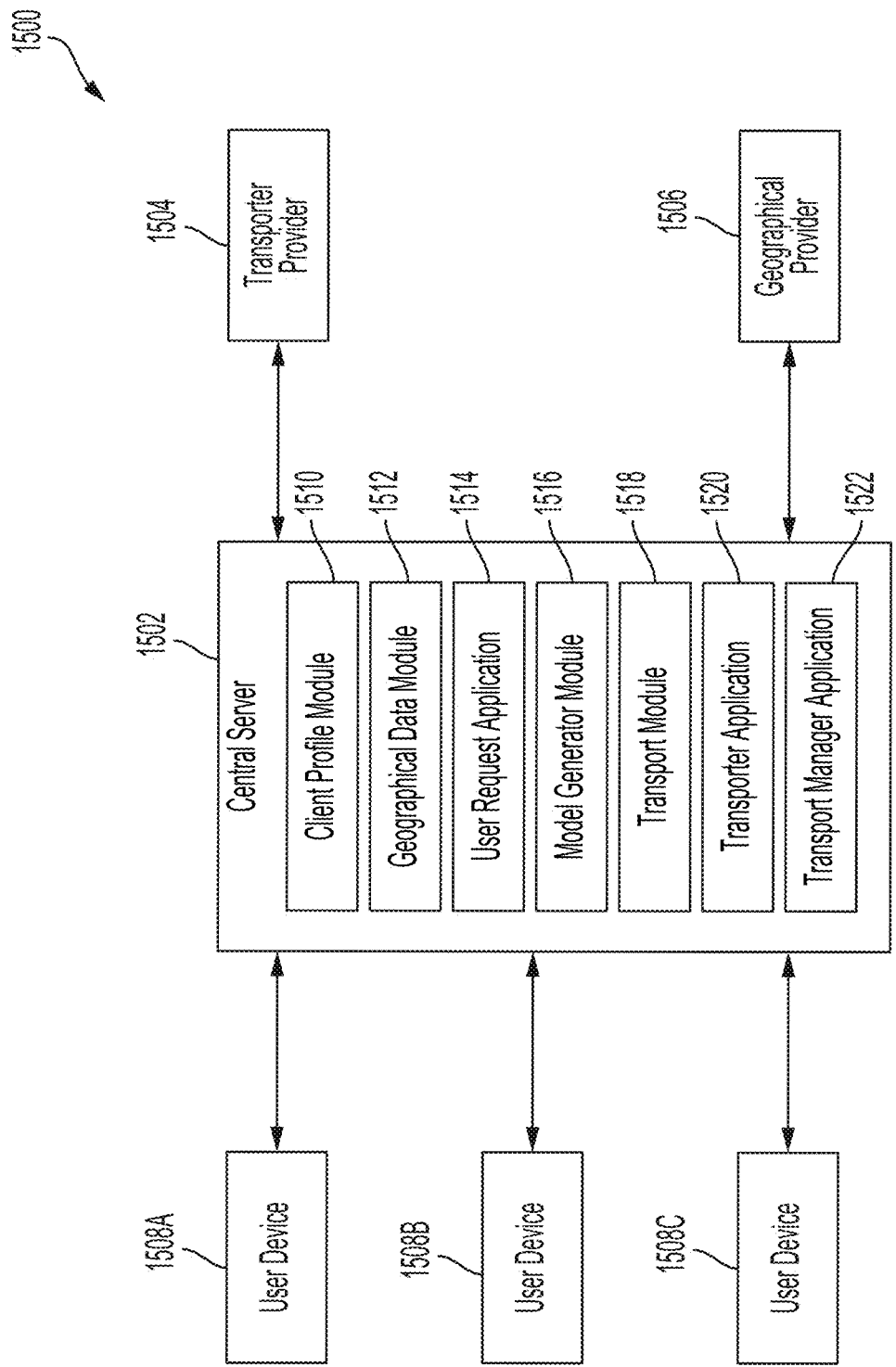
FIG. 15 is a block diagram of an example logistical management system.

FIG. 15 is a block diagram of an example logistical management system (LMS) 1500, according to some aspects. LMS 1500 can include central server 1502, transporter provider 1504, geographical provider 1506, and/or user devices 1508A-C. As will be discussed in more detail below, central server 1502 can receive and process requests for transporting goods from users of user devices 1508A-C. As such, in some aspects, users sending the requests can be from those in possession of the goods (e.g., owners of the goods). In some aspects, users can be a carrier delivery service company (e.g., United Parcel Service or FedEx Corporation). User devices 1508A-C can be a personal digital assistant (PDA), a desktop workstation, a laptop or notebook computer, a netbook, tablet, a smartphone, or any other type of electronic device, to name a few non-limiting examples.

Central server 1502 can be in communication transporter provider 1504 and/or geographical provider 1506. Transport provider 1504 can provide transport data of various transportation modes (e.g., airlines, trains, freight trucks). In some aspects, central server 1502 is in communication with multiple transportation providers 1504 providing transportation information for specific types of transportation and/or companies. For example, transportation providers can be American Airlines, Amtrak, and J.B. Hunt Transport Services. As such, central server 1502 can be in communication with multiple different transportation providers 1504 of the same or different types (e.g., train carriers, airline carriers, and vehicle carriers).

Further, geographical provider 1506 can provide geographical data required to process the request. As will be discussed in more detail below, the request includes a pickup and destination location, and, in processing the request, central server 1502 can identify intermediate locations, which relate to stops between the pickup location and the destination location. Accordingly, geographical provider 1506 can provide geographical data relating to the pickup, intermediate, and destination locations. As such, where the transporter is a vehicle, geographical data can include traffic and navigational data to pickup, intermediate, and destination locations at different times and days. Along these lines, geographical data can also be information on the pickup, intermediate, and destination location (e.g., parking, precise pickup locations (e.g., department), walking directions, and a map). Geographical provider 1506 can continually provide geographical data in real-time.

In receiving and processing requests, central server 1502 includes user profile module 1510, geographical data module 1512, user request application 1514, route generator module 1516, transporter module 1518, transporter application 1520, and/or transport manager application 1522.

User profile module 1510 stores user profiles. As discussed above, users can be a transportation company requesting transport of goods for their users (e.g., clients) or those requesting transport of their goods. As such, user profiles can be for the transportation companies requesting transport for their users or those wishing to transport their own goods. User profiles can include personal information (e.g., a name, a home address, a phone number, and an email address), previous shipping information (e.g., types of previously transported goods, sizes of previously transported goods, previous departing locations, and previous destination locations), user preferences (e.g., a particular transportation type or carrier). Further, in some aspects, as will be discussed in more detail below, user profiles can include a user value of time (which is used to derive a recommended route for the user).

Geographical data module 1512 can store geographical data received from geographical provider 1506 and/or from an authorized user. The geographical data can relate to the transport of goods. As discussed above, transporters can pick up goods from a pickup location or an intermediate location, and drop off the goods at the intermediate location, another intermediate location, or the destination location. In some aspects, the geographical data can relate to possible pickup locations, possible intermediate locations, and possible destination locations. The possible pickup and destination locations can be any physical location relating to the user seeking transport of the good, such as a personal residence (e.g., a house) or a place of business (e.g., a package delivery company, a hospital, a car manufacturer). The possible intermediate locations can be related to one or more modes of transportation. In some aspects, the modes of transportation can be rail (e.g., trains), air (e.g., airlines), road (e.g., cars, trucks), waterways (e.g., boats). In some aspects, the possible intermediate locations can be physical locations related to the modes of transportation. For example, where the mode of transportation is air, the possible intermediate locations can be private or public airports. Likewise, where the mode of transportation is road, the possible intermediate locations are truck stops. Additional possible intermediate locations include warehouses, customs offices, ports, etc.

Further, in some aspects, geographical data module can also include transit information relating to the possible pickup locations, the possible intermediate locations, and the possible destination locations. In some aspects, the transit information can also include pre-scheduled departure dates and times, pre-scheduled arrival dates and times, and/or pre-scheduled transport time, for example, for an airline and/or a freight. In some aspects, geographical data can also include cutoff times before departure for receipt of goods, for example, for an airport or a train station. Cutoff times refer to times that are the latest possible time that a package or good can be deliver to a recipient and still make a connection to the next segment of the route.

Along these lines, the transport data can also relate to each possible route from the possible pickup locations to the possible intermediate locations or the possible destination locations and from the possible intermediate locations to other possible intermediate locations and the possible destination locations. In some aspects, the transit information can include driving data (e.g., navigational data, traffic data, road closure data, etc.). Along these lines, geographical data module 1512 can receive updates form geographical provider 1506 relating to the transit information (e.g., new departure dates and updates, new arrival dates and times, new transport times, new routes, etc.).

Geographical data module 1512 can also generate a graph for route generator module 1516 to utilize for generating a preferred route from a pickup location to a destination location. Geographical data module 1512 can generate a graph (pre-generated graph) based on geographical data received from geographical provider 1506 and/or provided by an authorized user. In some aspects, the pre-generated graph includes nodes of all possible pickup locations, possible intermediate locations, and/or possible destination locations. In some aspects, the graph further includes all possible routes for traveling from the possible pickup locations to the possible intermediate locations, from the possible pickup locations to the possible destination locations, from the possible intermediate locations to other possible intermediate locations, and/or from the possible intermediate locations or to possible destination locations.

User request application 1514 receives requests for transporting goods from user devices 1508A-C. User request application 1514 can then process a request for transporting goods from starting a pickup location to a destination location. As discussed above, intermediate companies can utilize user request application 1514 on behalf of their consumers. Additionally, consumers can directly utilize user request application 1514 to transport goods.

Central server 1502 further includes route generator module 1516 to generate a preferred route from a pickup location to a destination location. In some aspects, upon user request application 1514 receiving a user request, user request application 1514 sends the request to the route generator module 1516, which requests the pre-generated graph, as discussed above, from geographical data module 1512. Route generator module 1516 then translates the pre-generated graph to identify the user request's pickup and destination locations. In some aspects, route generator module 1516 also identifies possible intermediate locations corresponding to the pickup and destination locations based on the geographical data.

As discussed above, the possible intermediate locations relate to locations for products to change carriers and/or modes of transportation to arrive at the destination location. In some aspects, the possible intermediate locations corresponding to the pickup and destination locations provided in the request are less than all possible intermediate locations provided in the pre-generated graph. In some aspects, route generator module 1516 can also identify transit information for the pickup location, each possible intermediate location, and the destination location, as described above.

Further, route generator module 1516 can also identify possible routes from the pickup location to each possible intermediate location, from the pickup location to the destination location, from each possible intermediate location to another possible intermediate location, and/or from each possible intermediate location to the destination location. In some aspects, route generator module 1516 can identify multiple possible routes from one location to another location. For example, route generator module 1516 can identify multiple routes from the pickup location to a possible intermediate location.

Route generator module 1516 can generate a subgraph from the pre-generated graph based on the pickup location, the destination location, the possible intermediate locations, and/or the possible routes. In some aspects, route generator module 1516 can generate the possible routes after generating the subgraph. In some aspects, route generator module 1516 can generate the subgraph with the possible routes.

Figure 16:
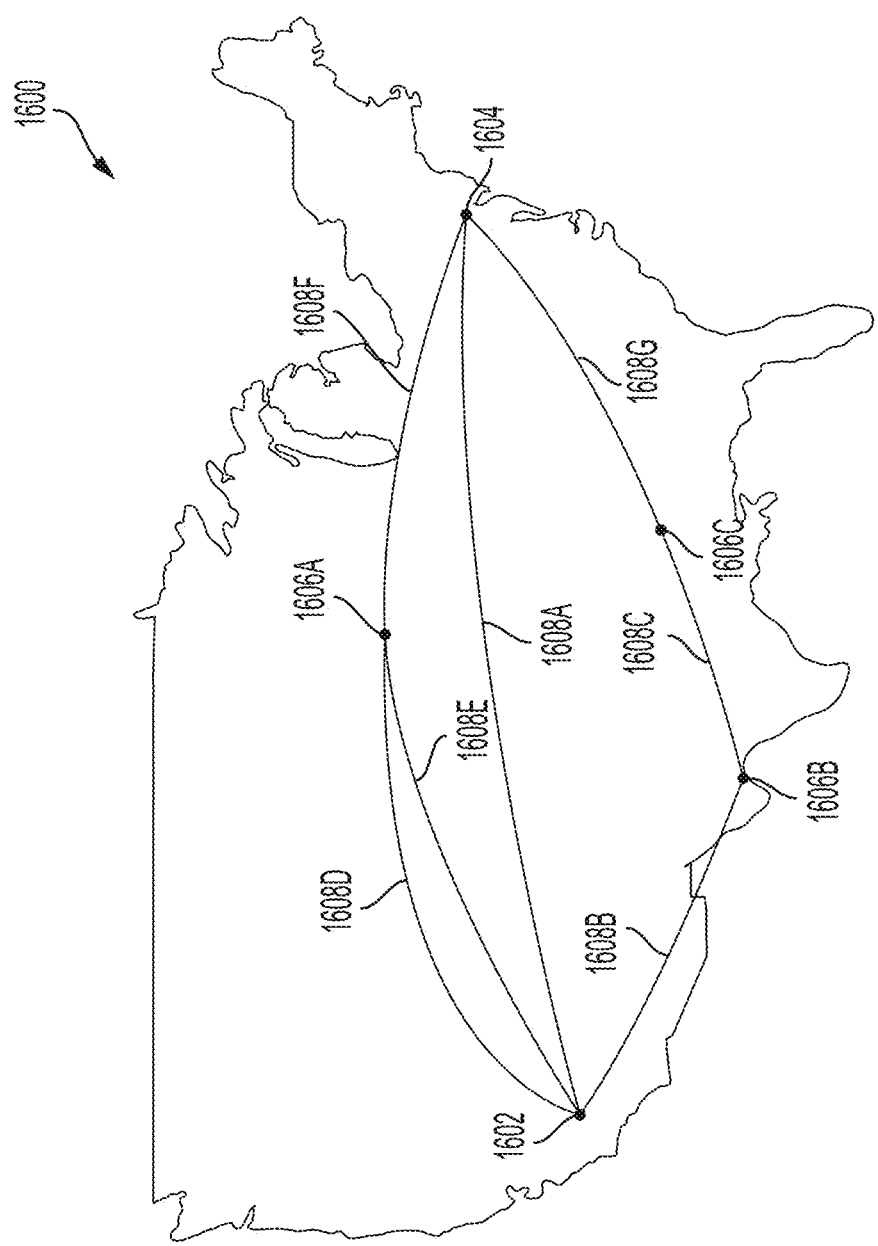
FIG. 16 is an example transportation graph generated by a route generator module.

FIG. 16 is an example transportation graph 1600 for the transport of goods from pickup location 1602 to destination location 1604. In some aspects, transportation graph 1600 is the pre-generated graph received from geographical data module 1512 (of FIG. 15). In some aspects, transportation graph 1600 is a subgraph of the pre-generated graph.

Further, as discussed above, in some aspects, transportation graph 1600 can include any combination of possible intermediate locations 1606A-C. For example, in some aspects, transportation graph 1600 can include a single possible intermediate location 1606A. Further, in some aspects, transportation graph 1600 can include multiple possible intermediate locations 1606B and 1606C.

Accordingly, in some aspects, transportation graph 1600 can include possible transportation segments 1608A-G relating to the possible routes from starting location 1602 to destination location 1604, from starting location 1602 to each possible intermediate location 1606A-C, from each intermediate location 1606A-C to another possible intermediate location 1606A-C, and from each intermediate location 1606A-C to destination location 1604. In some aspects, transportation graph 1600 can include a single possible transportation segment 1608A from pickup location 1602 to destination location 1604, and a single possible transportation segment 1608B from pickup location 1602 to possible intermediate location 1606B. Further, in some aspects, transportation graph 1600 can also include a single possible transportation segment 1608C from one possible intermediate location 1606B to another possible intermediate location 1606C. Along these lines, in some aspects, transportation graph 1600 can also include multiple possible transportation segments 1608D and 1608E from pickup location 1602 to possible intermediate location 1606A. Further, transportation graph 1600 includes a possible transportation segment 1608F from possible intermediate location 1606A to destination location 1604, and also includes a possible transportation segment 1608G from possible intermediate location 1606C to destination location 1604.

As described above, pickup location 1602, possible intermediate locations 1606A-C, and destination location 1604 can relate to the same or different modes of transportation locations (e.g., airports, train stations, trucking stations, etc.). Accordingly, possible transportation segments 1608A-G can relate to the same or different modes of transportation (e.g., vehicle, airplane, train, waterway, etc.). For example, possible transportation segments 1608D and 1608E—from pickup location 1602 to possible intermediate location 1606A—can relate to the same mode of transportation (e.g., airplane). Alternatively, possible transportation segment 1608D can relate to one mode of transportation (e.g., vehicle), while possible transportation segment 1608E can relate to another mode of transportation (e.g., airplane). The same can apply from pickup location 1602 to destination location 1604 and from one possible intermediate location 1606B to another possible intermediate location 1606C. As such, a complete route from pickup location 1602 to destination location 1604, with or without intermediate locations 1606A-C, can utilize the same or different modes of transportation.

As described above, after generating the subgraph from the pre-generated graph, route generator module 1516 (of FIG. 15) also receives transport data relating to the pickup location 1602, destination location 1604, each possible intermediate locations 1606A-C, and possible transportation segments 1608A-G from transporter module 1518 (of FIG. 15). In some aspects, route generator module 1516 can be in communication with transporter module 1518 to determine one or more transformation edges for each of pickup location 1602, destination location 1604, and each possible intermediate location 1606A-C. Route generate module 1516 can associate the transformation edges to the pickup location 1602, destination location 1604, and/or each possible intermediate location 1606A-C.

Figure 17:
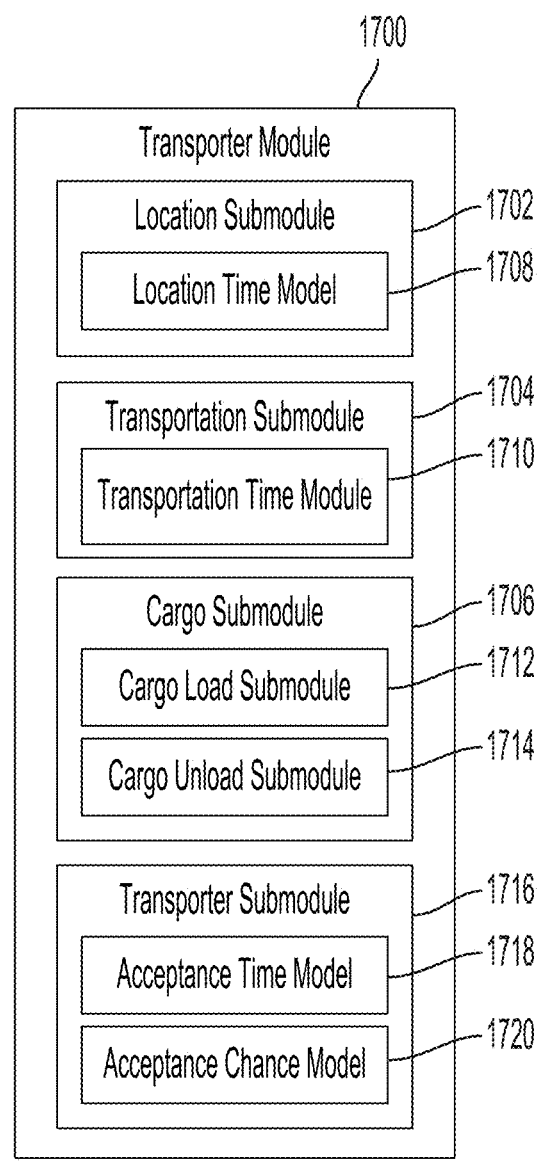
FIG. 17 is a block diagram of an example transport module.

FIG. 17 illustrates an example transporter module 1700 including location submodule 1702, transportation submodule 1704, and cargo submodule 1706. As will be described in more detail below, location submodule 1702 can provide a tendering edge corresponding to an actual tendering time at each of pickup location 1602, destination location 1604, and each possible intermediate location 1606A-C (of FIG. 16). Transportation submodule 1704 can provide a transportation edge corresponding to an actual transport time or actual transport cost for each possible route from each of pickup location 1602, destination location 1604, and each possible intermediate location 1606A-C. Cargo submodule 1706 can provide a cargo edge providing a load or unload time of the good at each of pickup location 1602, destination location 1604, and each possible intermediate location 1606A-C. Location submodule 1702 determines an amount of time for a particular or average transporter to perform tendering good actions at the pickup location, each possible intermediate location, and the destination location ("actual tender time"). Tendering good actions at pickup locations relate to transporters arriving at the pickup location, receiving the goods, and returning to their mode of transportation. Likewise, tendering good actions at the intermediate and destination locations relate to arriving at the intermediate or destination locations and tendering the goods.

For example, in some aspects, for determining the actual tender time at the pickup location, location submodule 1702 can determine an aggregate amount of time for a particular transporter to park their vehicle at the pickup location (e.g., hospital), walk a particular place of the pickup location (e.g., a lab), receive the goods (e.g., scanning and signing for the packages of goods), and return to their vehicle. Likewise, for determining the actual tender time at an intermediate location, location submodule 1702 can determine an aggregate amount of time for a particular transporter to park their vehicle at the intermediate location (e.g., airport), walk to a tender location of the intermediate location (e.g., cargo window), and tender the goods (e.g., wait in line and fill out the appropriate paperwork). Similarly, for determining the actual tender time at the destination location, location submodule 1702 can determine an aggregate amount of time for a particular transporter to park their vehicle at the intermediate location (e.g., airport), walk to the tender location (e.g., a different hospital), walk a particular place of the pickup location (e.g., a surgery center), and provide the goods (e.g., receiving a signature).

Along these lines, in some aspects, location submodule 1702 includes location time model 1708 to predict the actual tender time at the pickup location, each possible intermediate location, and the destination location. In some aspects, location time model 1708 can be a machine-learning model trained on historical tender times for known pickup, intermediate, and destination locations and known transporters. In some aspects, location time model 1708 can consider that different pickup, intermediate, and destination locations have different processing times based on, for example, size, wait time, and processing requirements. Along these lines, location time model 1708 can consider that different transporters take different tender times to at the pickup, intermediate, and destination locations. For example, some transporters can walk to and from a location quickly, whereas other transporters can do so slowly.

Further, in some aspects, for determining the actual tendering time, location time model 1708 considers the current waiting times of the pickup, intermediate, and/or destination locations for receiving, tendering, and/or delivering the goods, respectively. Accordingly, location time model 1708 can increase any previously determined transport time by a waiting time for tendering the goods. Also, in some aspects, location time model 1708 can predict the amount of time for new pickup/intermediate/destination locations (e.g., where transporters have not previously picked up or delivered goods). In doing so, location time model 1708 can consider publically known data of the new pickup/intermediate/destination location and transporters' historical times for known pickup/destination locations. Publically known data on the new pickup/destination location can include an average number of individuals (e.g., at various times throughout the day) and a size of the location.

Transportation submodule 1704 determines an actual transport time or an actual cost for a particular or average transporter to transport the goods from one location to another location ("actual transport time" or "actual transport cost"). The actual transport time and/or actual transport cost can depend on a mode of transportation (e.g., train, car, and airplane), current transport data (e.g., available routes and current traffic), and transporter's historical transport data (e.g., average miles per hour and an average amount of travel time). In some aspects, the actual transport time and/or the actual transport cost can be received from transporter provider 1504 (of FIG. 15). In some aspects, transportation submodule 1704 can include a transportation time or cost model 1710 to predict the actual transport time or the actual transport cost. Transport time or cost model 1710 can be a machine-learning model trained on previously utilized transport data (e.g., used routes, traffic for particular routes, an average speed, and an average amount of travel time) for a particular or average transporter utilizing a particular mode of transportation.

Cargo submodule 1706 determines an amount of time for loading or unloading goods at the pickup location, each possible intermediate location, and the destination location ("actual cargo time"). In some aspects, cargo submodule 1706 includes cargo load submodule 1712 and cargo unload submodule 1714. Cargo load submodule 1712 determines an amount of time for placing and loading goods on a method of transportation upon receipt from an intermediate location ("actual cargo load time"). For example, upon tendering a particular package of goods to an airport, cargo load submodule 1712 determines the amount of time for the airport to place the package of goods on the flight. In some aspects, the cargo load time can be the method of transportation's cutoff time for receiving packages (e.g., 1 hour before takeoff). In some aspects, the cargo load time can be based on the cutoff time, the departure time, and the cargo load time. Also, the cargo load time can be further based on a cargo open and closed time provided by the method of transportation (e.g., 6:00 AM-12:00 AM).

To determine the actual cargo load time, cargo load submodule 1712 receives the cutoff time, departure time, and/or cargo open and closed time from transporter provider 1504 of FIG. 15 (e.g., American Airlines, United Airlines, etc.) or a transportation agency (e.g., airport, train station, etc.). Accordingly, cargo load submodule 1712 can update the cargo load time based on feedback by the transporter provider 1504 (of FIG. 15) and the transportation agency.

For example, if a flight is delayed an hour, cargo load submodule 1712 will move the cutoff time and departure time back an hour.

Cargo unload submodule 1714 determines an amount of time for unloading the goods from a method of transportation ("actual cargo unload time"). Like cargo load submodule 1712, cargo unload submodule 1714 receives the cargo arrival time, the cargo unload open time, the cargo unload close time, and/or a transportation agency (e.g., airport, train station, etc.) from transporter provider 1504 (e.g., American Airlines, United Airlines, etc.). Accordingly, cargo unload submodule 1714 can update the actual cargo unload time based on feedback by the transporter provider 1504 (of FIG. 15) and the transportation agency.

Referring to FIG. 15, in some aspects, after associating transporter module 1518's transport data with one or more edges of transportation graph 1600's pickup location 1602, destination location 1604, possible intermediate locations 1606A-C, and possible transportation segments 1608A-G (of FIG. 16) (e.g., a tendering edge, a transportation edge, and/or a cargo edge), route generator module 1516 can request user preferences and/or a user value of time from user profile module, which can be unique to a user seeking transport of the good. Route generator module 1516 can then determine an optimal route based on user-selected service type, which can be one of: a fastest route, a drive-only route, an economy route, and/or a recommended route.

In some aspects, where user-selected service type is the fastest route, route generator module 1516 can generate a preferred route from pickup location 1602 to destination location 1604 (of FIG. 16) based on the least amount of time and/or on the user preference. Route generator module 1516 can select the preferred route irrespective of the actual cost for transporting the good. For instance, route generator module 1516 can select segment 1608A to route a good from pickup location 1602 to destination location 1604 although other segments can have a lower cost. Along these lines, if the user prefers a certain mode of transportation or carrier, route generator module 1516 can select segments corresponding to the preferred mode of transportation or carrier, although other segments permit the good to arrive at destination location 1604 sooner.

In some aspects, where user-selected service type is drive-only and economy route, the preferred route from pickup location 1602 to destination location 1604 based on the actual cost and the user preference. In some aspects, for the recommended route, route generator module 1516 generates a preferred route from pickup location 1602 to destination location 1604 (of FIG. 16) based on actual cost, user preference, and a likelihood of route approval. Along these lines, as illustrated above with respect to FIG. 17, the transport and location data can be in the form of time (e.g., minutes) and actual cost (e.g., dollars). Accordingly, as stated above, in some aspects, for the drive-only, economy, and recommended routes, route generator module 1516 can determine a true user cost relating to the pickup location, possible intermediate location, destination location, and/or possible transportation segments. In some aspects, for the drive-only and economy routes, route generator module 1516 can determine a cost per interval of time (e.g., 2 dollars per minute) or a time per monetary unit (e.g., 2 minutes per dollar). In some aspects, route generator module 1516 determine a cost per interval of time or a time per monetary unit based on previous user orders In some aspects, the cost per interval of time can be (Avg$PerMin(OnOperationsOrCustomerApprovedOrders)*Approval Weight)+(Avg$PerMin(OnOperationsOrCustomerDisapprovedOrders)*DisapprovalWeight). In some aspects, when the user is new, route generator module 1516 can assign a predetermined cost per interval of time (e.g., 2 dollars per minute) or a predetermined time per monetary unit (e.g., 2 minutes per dollar) for the user.

As such, for the economy and drive-only routes, where there is an actual cost (e.g., dollars) associated with possible intermediate locations 1606A-C and possible transportation segments 1608A-G (of FIG. 16), the client cost=actual cost×('cost per interval of time' or 'time per monetary unit'). For example, route generator module 1516 can consider a first and second possible route. The first possible route comprises a flight from pickup location 1602 to destination location 1604 ("possible transportation segment 1608A"). The second possible route comprises a drive from pickup location 1602 to intermediate location 1606B ("possible transportation segment 1608B"), a flight from intermediate location 1606B to intermediate location 1606C ("possible transportation segment 1608C"), and a drive from intermediate location 1606C to destination location 1604 ("possible transportation segment 1608G"). Possible segments 1608A-C and G can have an actual cost of $150, $10, $100, and $10, respectively. Further, the waiting times at the intermediate locations 1606B and 1606C can each be 40 minutes. Accordingly, assuming that minute per dollar is 2, route generator module 1516 can determine that the total client cost for the first possible route is 300 minutes ($150×2 'minutes per dollar') and that the total client cost for the second possible route is 320 minutes (($10×2 'minutes per dollar')+(40 minutes)+($100×2 'minutes per dollar')+(40 minutes)+($10×2 'minutes per dollar')). Accordingly, although the first possible route has an actual cost more than the second possible route (i.e., $150 vs. $120), route generator module 1516 will select the first possible route. In some aspects, for possible intermediate locations 1606A-C and possible transportation segments 1608A-G (of FIG. 16) having an associated time but not the actual cost, the user cost can be equal to weight time×(1/'handler approval' %). For possible intermediate locations 1606A-C and possible transportation segments 1608A-G (of FIG. 16) having an associated time and actual cost, the user cost can be equal to ((weight time+(actual cost×('cost per interval of time' or 'time per monetary unit')))×(1/'handler approval' %)).

Further, for the recommended route, route generator module 1516 can also consider a likelihood of approval of possible transportation segments 1608A-G (of FIG. 16) by a handler ("handler approval"). As will be described in more detail, handler approval is required for each route. Accordingly, upon determination of a route, the handler can then review the route and either approve or deny all of it or segments of it. Thus, if the route is approved or denied, all segments in the route are marked "good" or "bad." However, if changed, the unchanged segments are marked "good" and the changed segments are marked "bad." For example, if a user has previously submitted user requests and a particular segment has historically been approved for the user, the path search algorithm (e.g., A*) will likely prefer the particular segment. However, if a particular user has not previously submitted user requests, the likelihood of approval for a particular segment for the particular user can be based on other users. For example, if the particular user is requesting transport of a good similar to other transporters where the particular segment was approved, the likelihood of approval for the particular segment can be high. However, if the particular user is requesting transport of a good different from other transporters where the particular segment was not approved, the likelihood approval for the particular segment can be low. By operating in such a fashion, route generator module 1516 can accurately consider different possible legs and routes that have different times and costs as preferred by the user.

In aspects, logistical management system 1500 can automatically approve recommended routes or automatically create task icons 210 for handler approval of recommended routes based upon the likelihood of handler approval. For example, in aspects in which logistical management system 1500 has high confidence that the recommended route would be approved by a handler logistical management system 1500 it can automatically approve of the route and offload that task from the handler. Alternatively, if logistical management system 1500 has low confidence that the recommended route would be approved by the handler logistical management system 1500 it can create a task icon 210 for the handler to approve of the recommended route. In aspects, can further automatically create task icons 210 to verify or correct low confidence routes by rerouting from a low confidence segment to a high confidence segment.

After deriving the transit cost for each segment of the path, irrespective of user-selected service type, route generator module 1516 can utilize a path-finding algorithm to find a preferred route—having one or more segments—among the plurality of possible routes having a lowest cost (e.g., transit cost). In some aspects, the path-finding algorithm can be A*, although other path-finding algorithms can be utilized.

Additionally, route generator module 1516 can receive updates from transporter provider 1504 on the delay of scheduled transports (e.g., flights, trains, buses). Likewise, route generator module 1516 can receive updates from geographical provider 1506 relating to drive-only transportation (e.g., traffic, road closure, accidents). In some aspects, route generator module 1516 can receive the updates in real-time. Accordingly, route generator module 1516 can update the preferred route based on the service type (e.g., fastest route) and/or the user-selected delivery date and time (e.g., Mar. 16, 2020, at 2:00 PM EST). Route generator module 1516 can then utilize the path-finding algorithm to see if a new preferred path exists.

Figure 18:
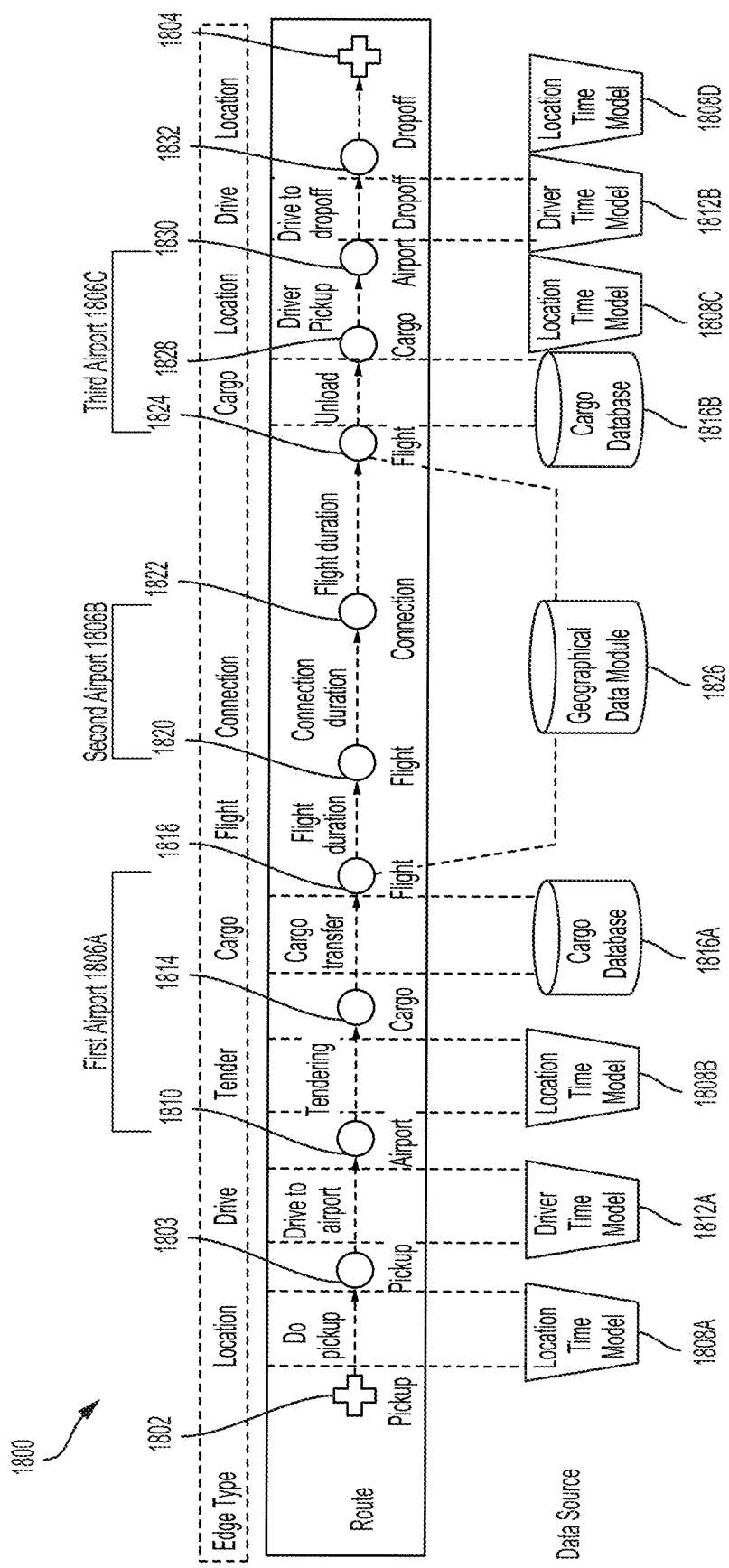
FIG. 18 is an example route having a connection as constructed by a route generator module in communication with a transport module.

FIG. 18 is an example of route 1800 from pickup location 1802 to destination location 1804 via three intermediate locations: a first airport 1806A, a second airport 1806B, and a third airport 1806C. Location time model 1808A determines a tendering time at pickup location 1802, location time model 1808B determines a tendering time at the first airport 1806A, location time model 1808C determines a tendering time at the third airport 1806C, and location time model 1808D determines a tendering time at destination location 1804. Specifically, location time model 1808A determines a time to do a pickup at pickup location 1802, location time model 1808B determines a time to tender the goods to the first airport 1806A, location time model 1808C determines a time to remove the goods from cargo and ready them for pickup from the third airport 1806C, and location time model 1808D determines a time required for the drop at the destination location 1804. Cargo database 1816A determines a time to transfer the goods to cargo at the first airport 1806A, while cargo database 1816B determines a time for unloading at the third airport 1816B. Geographical data model 1826 determines the flight duration from the first airport 1806A to the second airport 1806B, the flight duration from the second airport 1806B to the third airport 1806C, and the time idle (i.e., layover duration) at the second airport 1806B. Driver time model 1812A and driver time model 1812B are examples of transportation time models. Driver time model 1812A determines a travel time from pickup location 1802 to the first airport 1806A, while driver time model 1812B determines a travel time from the third airport 1806C to destination location 1804.

Accordingly, a transporter arrives at pickup location 1802, receives goods, and departs at time point 1803. The transporter then arrives at first intermediate location 1806A (e.g., first airport) at time point 1810. The goods are tendered until time point 1814. The goods are then transferred via cargo until time point 1818 so that they are ready for transport to second intermediate location 1806B (e.g., second airport). Thereafter, the goods depart from first intermediate location 1806A (e.g., first airport) to second intermediate location 1806B (e.g., second airport) at time point 1820.

After arriving at second intermediate location 1806B (e.g., second airport), route 1800 has a layover. As such, the goods depart from second intermediate location 1806B (e.g., second airport) at time point 1822, and arrive at third intermediate location 1806C (e.g., third airport) at time point 1824. Upon arriving at third intermediate location 1806C (e.g., third airport), goods are transferred via cargo until time point 1828 so that they are ready for pickup by a transporter for delivery to destination location 1804. The transporter thus arrives at the third intermediate location 1806C, receives the goods, and departs to the destination location 1804 at time point 1830. After arrival at destination location 1804 at time point 1832, transporter drops off the goods to an authorized individual.

Referring back to FIG. 15, during and/or after the appropriate route from a pickup location to a destination location, transporter application 1520 receives requests from transporters—via user devices 1508A-C—for transporting goods from a pickup location to an intermediate location (e.g., an airport) or a destination location. As such, transporter application 1520 can provide instructions to transporters via user devices 1508A-C during their route, as will be discussed in more detail below. Accordingly, after the submission of an order of goods as described previously, transporter application 1520 communicates with transporter module 1518 to identify an appropriate transporter for transporting goods from the pickup location to the intermediate or destination locations.

Referring now to FIG. 17, to identify the appropriate transporter, transporter module 1700 further includes transporter submodule 1716. After users submit orders, transporter submodule 1716 identifies available transporters within a predetermined distance from the pickup location or intermediate, for example, by tracking their location through user devices 1508A-C (of FIG. 15). The available transporters can be assigned to another job. In other words, the available transporters can have picked up or be scheduled to pick up goods for another job from a different or same pickup location. Likewise, the available transporters can be scheduled to transport goods for another to a different or same intermediate or destination location.

Referring to FIG. 17, transporter submodule 1716 can then determine if the number of identified available transporter meets or exceeds a predetermined number of available transporters. Transporters can relate to an individual or a carrier. In some aspects, if the number of identified available transporters does not meet or exceed a predetermined number of drivers, transporter submodule 1716 can expand the searchable range by a predetermined distance. Alternatively, if the number of identified available transporters does not meet or exceed a predetermined number of available transporters, transporter submodule 1716 can expand the searchable range until the predetermined number of available transporters is met. The predetermined distance can be 5 miles, 10 miles, 19 miles, or 50 miles, to provide a few examples. The predetermined number of available transporters can be 5, 10, 15, or 20, to provide a few examples.

Transporter submodule 1716 can then identify eligible transporters for transporting the goods from the available transporters. As discussed above, the goods can require special handling by the transporters. For example, the goods can be fragile (e.g., glass) or an organ (e.g., a heart). Further, the goods can be heavy (e.g., furniture) or need refrigeration (e.g., produce and human tissue) and thus require special transportation. Likewise, the goods can be of a certain size (e.g., a car) and thus need a suitable size carrier. As such, transporter submodule 1716 can ensure that the available transporters have the appropriate certifications and/or are of the appropriate kind of carriers (e.g., a vehicle or a truck). Thus, transporter submodule 1716 can filter through the available transporters for eligible transporters, for example, those that have the proper certification and/or are of the appropriate type of carriers. Transporter submodule 1716 can then determine if the number of eligible transporters meets or exceed a predetermined number of eligible transporters. If not, as discussed above, the searchable range is expanded by a predetermined distance or until the predetermined number of eligible transporters is met.

Transporter submodule 1716 can then determine if the eligible transporters are solicitable. Eligible transporters are solicitable if they are able to transport the good to the pickup location, intermediate location, or destination location by a time specified by route generator module 1516 (of FIG. 15) or a user in the request. Further, as mentioned above, eligible transporters can include those transporting or scheduled to transport other orders. Accordingly, these eligible transporters are solicitable if they are, or will be, going to the same pickup location, intermediate location, or destination location. Further, eligible transporters assigned other jobs are solicitable if they can complete transport all jobs by their specified times.

Accordingly, to identify solicitable transporters, transporter submodule 1716 determines an Estimate Completion Time (ECT) for completing transport of all jobs for each eligible transporter. As such, for an eligible transporter not transporting any other orders, transporter submodule 1716 determines an ECT for a transporter to pick up and deliver the solicited order. For an eligible transporter transporting other orders, transporter submodule 1716 determines an ECT for a transporter to pick up the orders from the pickup location and deliver the orders to the intermediate and destination locations in any sequence. To determine the ECT, transporter module 1700 can utilize a trained transporter model.

To determine the ECT, transporter submodule 1716 can utilize a trained transporter model. In some aspects, the trained transporter model can include transportation submodule 1704's transportation time model 1710 and/or location submodule 1702's location time model 1708. As discussed above, transportation time model 1710 determines an estimated amount of time for transporters to transport the goods to the pickup and/or intermediate locations ("an estimated transport time"). Accordingly, transportation time model 1710 (of FIG. 17) can determine particular routes for transporters to travel to pickup location or intermediate location. Location time model 1708 determines an estimated amount of time for transporters to tender the goods at pickup and/or intermediate locations ("an estimated tender time").

In some aspects, transporter submodule 1716's trained transporter model can also include transporter acceptance time model 1718 and transporter acceptance chance model 620. Transporter acceptance time model 1718 predicts an estimated amount of time that it will take a transporter to accept a solicitation for a job ("an estimated transporter acceptance time"). In some aspects, transporter acceptance time model 1718 can be based on a predetermined time provided to solicited transporters (e.g., 90 seconds). In some aspects, transporter acceptance time model 1718 is based on an output provided by transporter acceptance chance model 620, which can represent a likelihood of a particular solicitable transporter accepting the job. In some aspects, solicitation acceptance time can be equal to a predetermined solicit time×(1/a likelihood of solicitable transporter acceptance). In some aspects, transporter acceptance chance model 620 can be trained on historical data of the particular solicitable transporter accepting previous jobs, for example, at certain hours of the day.

Therefore, the ECT can be a total of an estimated tender time, an estimated transport time, and/or an estimated solicitation acceptance time. Along these lines, where the solicitable transporter is scheduled to transport multiple jobs, transporter submodule 1716 can derive the ECT for completing transport for picking up and delivering orders to the destination or intermediate locations in every possible sequence. After doing so, transporter application 1520 selects the sequence of events having the least amount of time to represent the time the solicitable transporter can perform the jobs.

For example, if the solicitable transporter was previously assigned "jobA" and is currently being solicited for "jobB," transporter submodule 1716 can determine an ECT for each of the following sequences—(i) picking up "jobA," picking up "jobB," delivering "jobA," and delivering "jobB," (ii) picking up "jobA," picking up "jobB," delivering "jobB," and delivering "jobA," (iii) picking up "jobA," delivering "jobA," picking up "jobB," and delivering "jobB," (iv) picking up "jobB," picking up "jobA," delivering "jobA," and delivering "jobB," (v) picking up "jobB," picking up "jobA," delivering "jobB," and delivering "jobA," and (vi) picking up "jobB," delivering "jobB," picking up "jobA," and delivering "jobA." Accordingly, if the ECT for sequences (i), (ii), (iii), (iv), (v), and (vi) is 120 minutes, 170 minutes, 130 minutes, 90 minutes, and 160 minutes, respectively, transporter application 1520 can select sequence (iii) as representing the transporter for the amount of time it can complete "jobA" and "jobB."

Along these lines, to compare multiple solicitable transporters previously assigned other jobs, transporter submodule 1716 can select the solicitable transporter having the shortest ECT for completing the solicited offer. For example, solicitable transporters "X" and "Y" can have been previously assigned "jobA" and "jobB," respectively, and are currently being solicited "jobC." As such, transporter submodule 1716 can determine that transporter "X"'s ECT for completing "jobA" and "jobC" is 120 minutes, and that transporter "Y"'s ECT for completing "jobB" and "jobC" is 180 minutes. In some aspects, transporter submodule 1716 can determine that transporter "X"'s and "Y"'s ECT for completing "jobC" is 70 minutes and 90 minutes, respectively. Accordingly, although transporter "X"'s ECT for completing both jobs is shorter than transporter "Y"'s ECT, transporter submodule 1716 can select transporter "Y" since transporter "Y" ECT for completing the transport of the solicited job—i.e., "jobC"—is shorter. In some aspects, transporter submodule 1716 can determine that transporter "X"'s and "Y"'s ECT for completing "jobA" is 120 minutes and 90 minutes, respectively. Transporter submodule 1716 can also determine that the transporter "X" is to complete "jobA" then "jobB" and that transporter "Y" is to complete "jobB" then "jobA." Accordingly, although transporter "Y" is to complete "jobB" after a previously assigned order, transporter "Y" can still be selected over transporter "X."

Along these lines, transporter submodule 1716 can consider solicitable transporters previously assigned other orders and solicitable transporters not previously assigned other orders. Transporter submodule 1716 can then select the solicitable transporter having the least ECT for completing transport of the solicited job as a preferred pickup transporter. For example, transporter submodule 1716 can consider transporters "A" and "B." Transporter "A" can have been previously assigned "jobA" and is being solicited for "jobB." Transporter B is only being solicited for "jobB." Accordingly, transporter submodule 1716 can determine that the ECT for transporters "A" and "B" for completing solicited offer "job" is 80 minutes and 100 minutes, respectively. As such, transporter submodule 1716 can select transporter "A," although it has been assigned another job (i.e., "jobA") and can deliver the other before the solicited job (i.e., "jobB").

Transporter submodule 1716 can then send a request to the preferred transporter to transport the order. In some aspects, transporter submodule 1716 can wait a predetermined amount of time (e.g., 90 seconds) for acceptance. If the solicited transporter does not accept the offer, transporter submodule 1716 can then restart the process to determine an appropriate transporter (i.e., identify available transporters, identify eligible transporters from the available transporters, etc.). In doing so, the transporter can be considered again for solicitation, albeit the acceptance chance model can derive a lower likelihood of accepting the job based on their lack of acceptance previously, thus being less likely to be solicited again.

Figure 20:
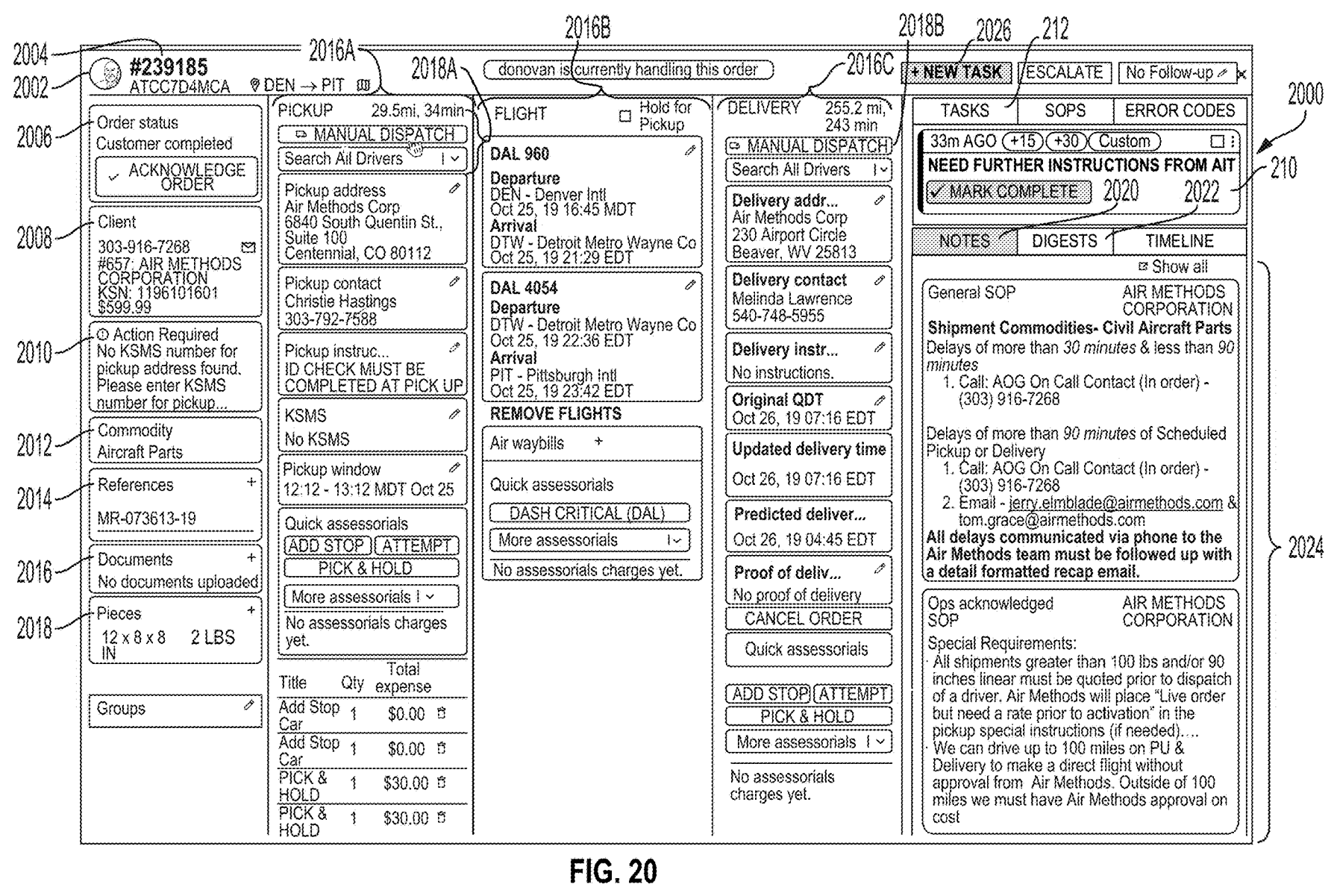

FIGS. 19 and 20 illustrate user interfaces 1900 and 2000 provided by transport manager application 1522 (of FIG. 15). FIG. 19 illustrates user interface 1900 for tracking orders 1902 in real-time. User interface 1900 provides order types 1904A-J and allows handlers to select and view orders of the different order types 1904A-J. Each order type 1904A-J can require different handling and/or skill. As such, operational teams can be trained to manage and/or handle different groups of order types 1904A-J. As such, operational team members (e.g., handlers) can select or be assigned orders. Handlers can be automatically assigned to orders by LMS 1500.

As illustrated, order types 1904A-J can include all orders 1904A, ground orders 1904B, next flight out (NFO) orders 1904C, fright orders 1904D, healthcare orders 1904E, immediate (STAT) orders 1904F, medical collection (MCP) orders 1904G, routed orders 1904H, escalated orders 1904I, and/or will call orders 1904J, or other categories of orders. All orders 1904A can relate all orders currently being processed. As such, all orders 1904A includes ground orders 1904B, NFO orders 1904C, fright orders 1904D, healthcare orders 1904E, STAT orders 1904F, MCP orders 1904G, routed orders 1904H, and/or escalated orders 1904I. Ground orders 1904B relates to orders of goods being transported by ground. As such, ground order 1904B relates to orders of goods whose routes do not have a segment and have a mode of transportation other than ground (e.g., a flight segment). NFO orders 1904C relates to orders of goods to be transported by flight and not requiring special handling. Freight orders 1904D relate to orders of goods needing special handling. For example, freight orders 1904D can be above a predetermined weight (e.g., 100 lbs.), greater than a predetermined dimension (e.g., 5 FT×5 FT×5 FT), call for a controlled temperature (e.g., less than 29° F.), and require secure shipment, to provide a few examples.

Healthcare orders 1904E can relate to orders of healthcare goods, which can or can not require special handling. STAT orders 1904F can relate to goods to be transported at predefined times (e.g., 8:00 AM and 4:00 PM) and/or places (e.g., hospitals, doctor offices, and pharmacies). MCP orders 1940G relate to orders of goods that require skill by transporters. In some aspects, for example, the packages can contain blood or a bodily tissue. Routed orders 1904H relates to orders having predetermined routes required to be followed by transporters. For example, where the transporter has multiple orders and must pick up one order or drop one order off in a particular sequence, the orders can be considered routed orders 1904H. Escalated order 1904I relates to any order manually escalated by an authorized user. As such, escalated order 1904I can include ground orders 1904B, NFO orders 1904C, fright orders 1904D, healthcare orders 1904E, STAT orders 1904F, MCP orders 1904G, and/or routed orders 1904H. Will call orders 1904J can be orders of goods submitted via will call by users, as described above. Will call orders 1904J are not active orders 1904A.

User interface 1900 presents all orders 1902 categorized under all orders group 1904A. For each order 1902, user interface 1900 can provide handler 1906, order number 1908, status indicator 1910, current transporter 1912, target location 1914, scheduled action 1916. Handler 1906 can be individual or member of the appropriate operational team in charge of the order of goods. Order number 1908 can be a unique alphanumeric number generated by central server 1502 (of FIG. 15) for the order. Status indicator 1910 can provide an indication of where the goods are in the route generated by central server 1502. For example, the goods can be at a pickup location, in transport to an intermediate location, at an intermediate location, in transport to a destination location, and/or at a destination location. Current transporter 1912 can refer to a specific transporter transporting the good at a particular time. Target location 1914 can refer to a current pickup location, intermediate location, or delivery location being traveled to by the transporter currently transporting the good. Scheduled action 1916 can be a follow-up action provided by handler 1906. The follow-up action can specify a desired time to perform the action.

For any order 1902, user interface 1900 can include a task indicator 1918 that can show details regarding pending tasks associated with a particular order 1902. By showing details regarding pending tasks associated with a particular order 1902 on user interface 1900 that lists a plurality of different orders 1902, handlers managing multiple orders 1902 can quickly view details regarding tasks that need to be performed for individual order 1902. This can help handlers prioritize orders, ensure that tasks are not missed, and can better integrate aspects of user interfaces 1900 and 2000.

Task indicator 1918 can, for example, include a count of the number of pending tasks associated with a particular order. Further, task indicator 1918 can be expandable to show yet further details regarding the tasks of a given order. For example, when activated (e.g., by clicking) task indicator 1918 can expand to review descriptions 1920 of the tasks that need to be performed for an order 1902. A characteristic of descriptions 1920 can change, for example, relative to the date the task is scheduled to be completed. For example, descriptions 1920 can change colors. In some aspects, the colors can be red, yellow, or green. The designated color can be selected based on predetermined rules. For example, descriptions 1920 can be green until reaching a predefined threshold (e.g., relative to the date the task is scheduled to be completed) and thereafter change to yellow. Thereafter, after reaching another predefined threshold (e.g., relative to the date the task is scheduled to be completed), the designated color can change to red. This can allow assigned handlers or other authorized users to prioritize management of the tasks for a given order 1902 while also managing other orders 1902 displayed on user interface 1900.

Referring now to FIG. 20, after the selection of a particular order 1902 (of FIG. 19) by a handler, user interface 2000 can be presented. User interface 2000 can include assigned handler 2002, order number 2004, order status 2006, user information 2008, actions required 2010, commodity type 2012, reference number 2014, attached documents 2016, and/or goods information 2018. Order status 2006 can be updated in real-time and be one of a predetermined number of events, such as those illustrated status indicator 1910 (of FIG. 19). User information 2008 can include contact information of a user requesting the transport of goods. Actions required 2010 can include actions required by a handler. Commodity type 2012 can relate to a good type. Reference number 2014 can be a tracking number for a particular package of goods of the order being transported. In some aspects, an order can include multiple packages having different tracking numbers. Attached documents 2016 can be documents relating to the transport of the goods and can be uploaded by the transporter (e.g., airway bill) and/or handler (e.g., airway bill example). As such, user information 2008, commodity type 2012, and/or goods information 2018 can be provided via a user request at a user interface. User interface 2000 can also permit handlers to provide notes 2020, digest 2022, and/or SOP 2024, as discussed previously.

User interface 2000 can also include segment information 2016A-C for segments of a route from a pickup location to a destination location. In some aspects, segment information 2016A relates to picking up the goods, segment information 2016B relates to tendering the goods at an intermediate location (e.g., an airport), and/or segment information 2016C relates to delivering the goods to a drop off location. As such, segment information 2016A includes transporter information (e.g., a name, a license plate, and/or a type of vehicle), a pickup address, a pickup contact, pickup instructions, a pickup window. Segment information 2016B includes information of the intermediate location. For example, when the intermediate location is an airport, segment information 2016B can include flight information (e.g., departure time, arrival time, departure location, arrival location, and flight number), and airway bills. Segment information 2016C includes a transporter delivery address, a delivery contract, delivery instructions, an original quoted delivery time, an updated delivery time, a proof of delivery.

As stated above, segment information 2016A and 2016C can include transporter information. In some aspects, as described above, upon submission of orders by users, the central server 1502 (of FIG. 15) can automatically select the appropriate transporter. Segment information 2016A and 2016C can also permit members to manually dispatch transporters 2018A and 2018B.

Segment information 2016A and 2016C permits assigned handlers to provide or select tasks (e.g., picking up dry ice for medication and/or printing documents) for transporters of goods. The handlers can reward the transporters for performing the tasking or attempting to do so, for example, by providing them a selected or predetermined amount of money. As explained above, the reward amount can be unknown to the transporter until completion of the transport.

User interface 2000 can also include new task button 2026, task dashboard 212, and/or task icons 210, which can be automatically generated by transport manager application 1522 (of FIG. 15). New task button 2026 can be used to create a new task and associated task icon 210, as discussed previously. Task dashboard 212 and task icons 210 can manage various tasks associated with orders, as discussed previously. Further, task icons 210 can communicate with other elements of user interface 2000 to streamline management of orders.

Completion of tasks associated with task icon 210 (e.g., by marking tasks complete with button 218) can in some instances automatically trigger responses in other elements of user interface 2000. For example, for task icon 210 associated with an action from actions required 2010 element of user interface 2000, marking task icon 210 complete by activating button 218 can trigger a response for action required 2010 element that automatically updates action required 2010 element to indicate that the action has been completed. Similarly, completion of task icons 210 can automatically trigger responses in notes 2020 (e.g., adding notes), digest 2022 (e.g., recording information associated with order events in digest 2022), and/or SOP 2024, among others. Integrating task icons 210 with other elements of user interface 2000 in this manner can improve order management efficiency and accuracy by providing a central location (e.g., task dashboard 212 and/or task icons 210) for completing a number of tasks associated with the order. This can reduce human error by eliminating actions required by handlers.

Figure 21:
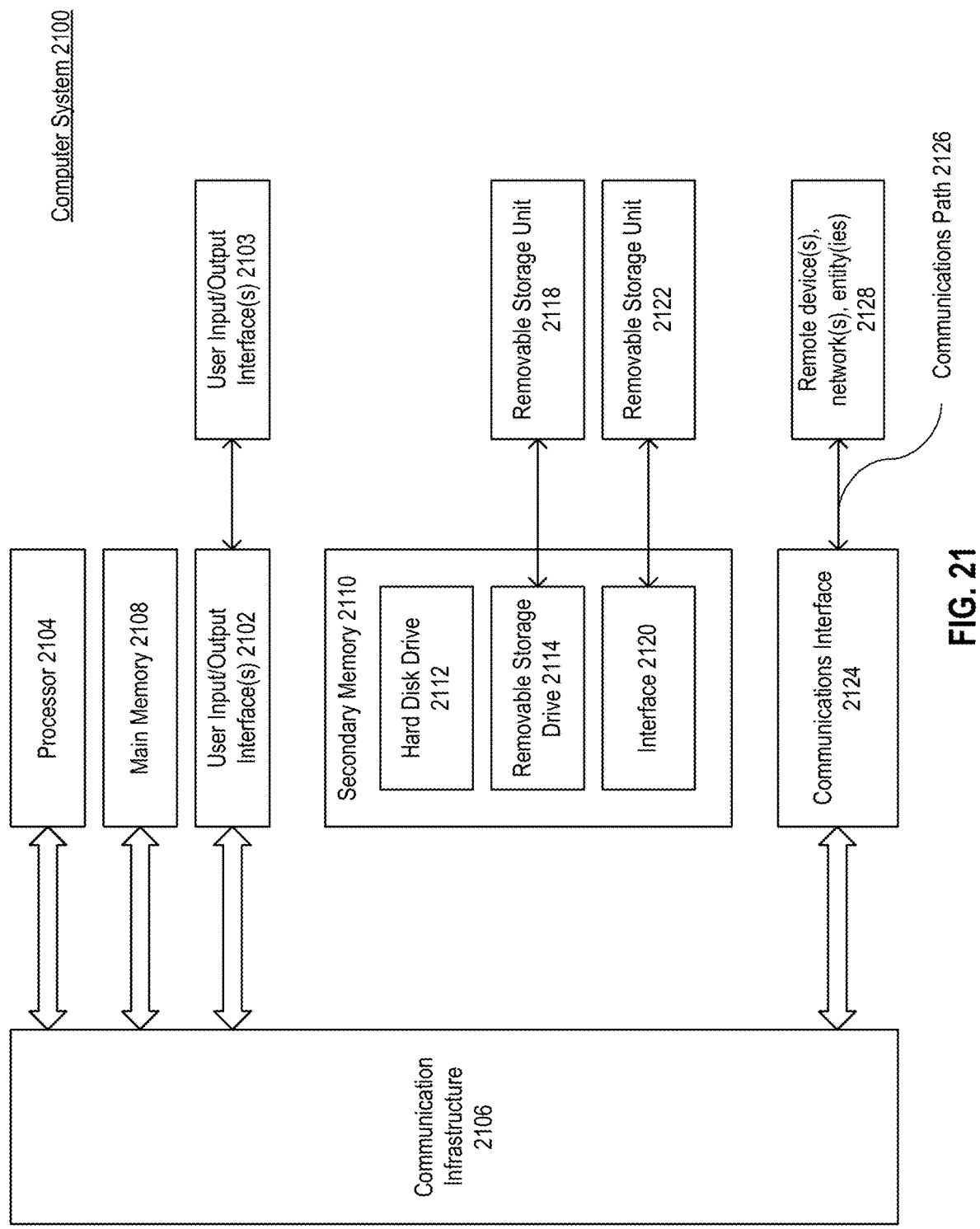
FIG. 21 is an example computer system useful for implementing various aspects.

Various aspects can be implemented, for example, using one or more well-known computer systems, such as computer system 2100 shown in FIG. 21. One or more computer systems 2100 can be used, for example, to implement any of the aspects discussed herein, as well as combinations and sub-combinations thereof.

Computer system 2100 can include one or more processors (also called central processing units, or CPUs), such as a processor 2104. Processor 2104 can be connected to a communication infrastructure or bus 2106.

Computer system 2100 can also include user input/output device(s) 2103, such as monitors, keyboards, pointing devices, etc., which can communicate with communication infrastructure 2106 through user input/output interface(s) 2102.

One or more processors 2104 can be a graphics processing unit (GPU). In an aspect, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 2100 can also include a main or primary memory 2108, such as random access memory (RAM). Main memory 2108 can include one or more levels of cache. Main memory 2108 can have stored therein control logic (i.e., computer software) and/or data.

Computer system 2100 can also include one or more secondary storage devices or memory 2110. Secondary memory 2110 can include, for example, a hard disk drive 2112 and/or a removable storage device or drive 2114. Removable storage drive 2114 can be a floppy disk drive, a magnetic tape drive, a compact disk drive, an optical storage device, tape backup device, and/or any other storage device/drive.

Removable storage drive 2114 can interact with a removable storage unit 2118. Removable storage unit 2118 can include a computer-usable or readable storage device having stored thereon computer software (control logic) and/or data. Removable storage unit 2118 can be a floppy disk, magnetic tape, compact disk, DVD, optical storage disk, and/any other computer data storage device. Removable storage drive 2114 can read from and/or write to removable storage unit 2118.

Secondary memory 2110 can include other means, devices, components, instrumentalities or other approaches for allowing computer programs and/or other instructions and/or data to be accessed by computer system 2100. Such means, devices, components, instrumentalities, or other approaches can include, for example, a removable storage unit 2122 and an interface 2120. Examples of the removable storage unit 2122 and the interface 2120 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2100 can further include a communication or network interface 2124. Communication interface 2124 can enable computer system 2100 to communicate and interact with any combination of external devices, external networks, external entities, etc. (individually and collectively referenced by reference number 2128). For example, communication interface 2124 can allow computer system 2100 to communicate with external or remote devices 2128 over communications path 2126, which can be wired and/or wireless (or a combination thereof), and which can include any combination of LANs, WANs, the Internet, etc. Control logic and/or data can be transmitted to and from computer system 2100 via communication path 2126.

Computer system 2100 can also be any of a Personal Digital Assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 2100 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), Data Center as a service (DCaaS), software as a service (SaaS), managed software as a service (MSaaS), platform as a service (PaaS), desktop as a service (DaaS), Function as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2100 can be derived from standards including but not limited to JavaScript Object Notation (JSON), Extensible Markup Language (XML), Yet Another Markup Language (YAML), Extensible HyperText Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some aspects, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 2100, main memory 2108, secondary memory 2110, and removable storage units 2118 and 2122, as well as tangible articles of manufacture embodying any combination of the foregoing. Such control logic, when executed by one or more data processing devices (such as computer system 2100), can cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 21. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc., using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects but should be defined only in accordance with the following claims and their equivalents.

What is claimed is:

1. A system comprising:
  a user interface comprising a display;
  a non-transitory computer-readable medium comprising instructions; and
  a processor in communication with the non-transitory computer-readable medium and with the display, wherein the instructions, when executed by the processor, are configured to cause the processor to:
    process, by the processor, a user request for transporting a good from a pickup location to a destination location, the process comprising:
      identifying, by the processor and within a pre-generated graph data structure, a pickup node representing the pickup location and a destination node representing the destination location;
      identifying, by the processor and within the pre-generated graph data structure, a first intermediate node representing a first intermediate location, and a second intermediate node representing a second intermediate location by traversing the pre-generated graph data structure based on the pickup node and the destination node;
      determining, by the processor, a plurality of transportation edges that each relate to a transit cost associated with a corresponding one of the pickup location, the first intermediate location, the second intermediate location, and the destination location, wherein each of the plurality of transportation edges correspond to one of the pickup node, the first intermediate node, the second intermediate node, and the destination node such that each of the pickup node, the first intermediate node, the second intermediate node, and the destination node corresponds to the transit cost;
      determining, by the processor, a tendering edge corresponding to the first intermediate node, the tendering edge relating to an actual tender time to move the good from a first vehicle that has arrived at the first intermediate location to a tender location of the first intermediate location;
      determining, by the processor and using a cargo database, a cargo edge corresponding to the first intermediate node, the cargo edge relating to a time for loading the good onto a second vehicle upon receipt of the good at the first intermediate location;
      generating, by the processor, a subgraph of the pre-generated graph data structure comprising the pickup node, the first intermediate node, the second intermediate node, the destination node, the tendering edge, the cargo edge, and the plurality of transportation edges; and
      generating a preferred route from the pickup location to the destination location based on the subgraph; and
    controlling, by the processor, the transporting of the good from the pickup location to the destination location along the preferred route, the controlling comprising:

modifying, by the processor, the display to include an automatically generated task icon associated with a task for managing the user request, the task icon comprising:
a description of the task;
a counter that displays a count to or from a date that the task is scheduled to be completed;
a button that when activated performs an action related to the task; and
automatically setting, by the processor, aspects of the task icon in response to triggers.

2. The system of claim 1, wherein the task icon further comprises a quick action button that is configured to adjust the date.

3. The system of claim 2, wherein the quick action button represents an amount of time and, when activated, the quick action button is configured to adjust the date the task is scheduled to be completed by the amount of time.

4. The system of claim 3, wherein the amount of time is automatically set by the instructions.

5. The system of claim 3, wherein the amount of time is customizable by a user.

6. The system of claim 1, wherein a characteristic of the count is configured to change as the count changes relative to the date that the task is scheduled to be completed.

7. The system of claim 1, wherein the task icon is a first task icon and the task is a first task, and
wherein the instructions, when executed by the processor, are configured to cause the processor to automatically generate and display on the display a second task icon associated with a second task for managing the order, wherein the second task is different from the first task, the second task icon comprising:
a description of the second task;
a counter that displays a count to or from a date that the task is scheduled to be completed; and
a button that when activated performs an action related to the task.

8. The system of claim 7, wherein the instructions when executed by the processor are configured to cause the processor to automatically modify the first and second task icons together in batches.

9. The system of claim 1, further comprising a communication interface that is configured to receive data from an external device, wherein the instructions when executed by the processor are configured to cause the processor to automatically generate the task icon in response to the data from the external device.

10. The system of claim 1, wherein determining the tendering edge comprises using a location time machine-learning model trained on historical tender times.

11. The system of claim 1, wherein the preferred route generated by the processor has a lowest transit cost of transporting the good from the pickup location to the destination location.

12. The system of claim 1, wherein the instructions when executed by the processor are configured to cause the processor to automatically generate the task icon in response to a trigger.

13. The system of claim 1, wherein the instructions when executed by the processor are configured to cause the processor to automatically complete the task icon in response to a trigger.

* * * * *